US010225030B2

(12) United States Patent
Michael et al.

(10) Patent No.: US 10,225,030 B2
(45) Date of Patent: Mar. 5, 2019

(54) RECEPTION APPARATUS AND DATA PROCESSING METHOD

(71) Applicant: SONY CORPORATION, Tokyo (JP)

(72) Inventors: Lachlan Bruce Michael, Saitama (JP); Kazuyuki Takahashi, Chiba (JP); Satoshi Okada, Tokyo (JP); Yuichi Hirayama, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/572,904

(22) PCT Filed: Jul. 22, 2016

(86) PCT No.: PCT/JP2016/071567
§ 371 (c)(1),
(2) Date: Nov. 9, 2017

(87) PCT Pub. No.: WO2017/026249
PCT Pub. Date: Feb. 16, 2017

(65) Prior Publication Data
US 2018/0131457 A1    May 10, 2018

(30) Foreign Application Priority Data
Aug. 7, 2015  (JP) .................................. 2015-157708

(51) Int. Cl.
*H04L 7/00* (2006.01)
*H04H 60/40* (2008.01)
(Continued)

(52) U.S. Cl.
CPC ............ *H04H 60/40* (2013.01); *H04H 20/95* (2013.01); *H04N 5/775* (2013.01); *H04N 9/8205* (2013.01);
(Continued)

(58) Field of Classification Search
CPC .. H04N 21/4302; H04N 21/4305; H04L 7/00; H04L 7/0012; H04L 65/4076
See application file for complete search history.

(56) References Cited

U.S. PATENT DOCUMENTS 10,009,413 B2 * 6/2018 Wohlert .................. H04L 67/10
2011/0038370 A1   2/2011 Tapie et al.
(Continued)

FOREIGN PATENT DOCUMENTS

EP    3 073 745 A1    9/2016
GB    2515539 A    12/2014
(Continued)

OTHER PUBLICATIONS

International Search Report dated Oct. 18, 2016 in PCT/JP2016/071567 filed Jul. 22, 2016.
(Continued)

*Primary Examiner* — Scott M Sciacca
(74) *Attorney, Agent, or Firm* — Oblon, McClelland, Maier & Neustadt, L.L.P.

(57) ABSTRACT

The present technology relates to a reception apparatus and a data processing method that permit efficient processing of time information.
The reception apparatus receives a digital broadcasting signal based on an IP transport scheme, acquires time information from a physical layer frame transported in a physical layer of a protocol stack for the IP transport scheme, converts the acquired time information into the same data format as data provided in a payload of the physical layer frame, and outputs the converted time information to a processing section that performs a given process relating to an upper layer that is a layer higher than the physical layer. The present technology is applicable, for example, to a television receiver that supports an IP transport scheme.

10 Claims, 22 Drawing Sheets

(51) Int. Cl.
*H04N 21/43* (2011.01)
*H04N 21/434* (2011.01)
*H04N 5/775* (2006.01)
*H04N 9/82* (2006.01)
*H04H 20/95* (2008.01)
*H04J 3/06* (2006.01)
*H04N 5/765* (2006.01)
*H04N 9/804* (2006.01)

(52) U.S. Cl.
CPC ..... *H04N 21/4305* (2013.01); *H04N 21/4344* (2013.01); *H04J 3/0664* (2013.01); *H04J 3/0667* (2013.01); *H04N 5/765* (2013.01); *H04N 9/8042* (2013.01)

(56) References Cited

U.S. PATENT DOCUMENTS

| 2013/0128116 A1* | 5/2013 | Knowles | H04W 56/001 |
| | | | 348/521 |
| 2015/0063357 A1* | 3/2015 | Hwang | H04L 5/0044 |
| | | | 370/392 |
| 2016/0241925 A1 | 8/2016 | Iguchi et al. | |
| 2016/0373807 A1* | 12/2016 | Kwak | H04H 60/72 |

FOREIGN PATENT DOCUMENTS

| JP | 2011-518509 A | 6/2011 |
| WO | 2014/188960 A1 | 11/2014 |
| WO | 2015/068352 A1 | 5/2015 |

OTHER PUBLICATIONS

Reinhard Exel, "Mitigation of Asymmetric Link Delays in IEEE 1588 Clock Synchronization Systems", IEEE Communications Letters, Mar. 2014, vol. 18, No. 3, pp. 507-510.

"Transmission System for Advanced Wide Band Digital Satellite Broadcasting" Association of Radio Industries and Businesses, ARIB Standard, ARIB STD-B44 Version 2.0-E1, Jul. 31, 2014, 134 total pages.

European Office Action dated Nov. 30, 2018 in European Application No. 16834946.2, 8 pages.

* cited by examiner

F I G. 9

```
PTP struct Timestamp
{
    UInteger48 secondsField;
    UInteger32 nanosecondsField;
};
```

FIG. 10

| Syntax | No. of bits | Mnemonic |
|---|---|---|
| PTP_UTC_OFFSET | 16 | uimsbf |
| LEAP_SECOND_FLAG | 2 | bslbf |
| Reserved | 14 | bslbf |

FIG.14

| Packet_Type Value | Meaning |
|---|---|
| 000 | IPv4packet |
| 001 | CompressedIPpacket |
| 010 | MPEG-2TransportStream |
| 011 | Reserved |
| 100 | Linklayersignalingpacket |
| 101 | Reserved |
| 110 | Reserved |
| 111 | PacketTypeExtension |

FIG. 17

| Syntax | No. of Bits | Format | semantics |
|---|---|---|---|
| ATSC_Time_information() { | | | |
| table_id | 8 | uimsbf | SECTION ID FOR TRANSPORTING TIME INFORMATION |
| reserved | 6 | uimsbf | |
| ptp_short_format_indicator | 1 | uimsbf | FLAG INDICATING PTP FORMAT |
| utc_offset_metadata_indicator | 1 | uimsbf | FLAG INDICATING ADDITION OF UTC METADATA |
| if (ptp_short_format_indicator==1) { | | | |
|   ptp_second_field | 32 | uimsbf | PTP SECOND FIELD IN SHORT FORMAT |
|   ptp_nanosecond_field | 17 | uimsbf | PTP NANOSECOND FIELD IN SHORT FORMAT |
| }else{ | | | |
|   ptp_second_field | 48 | uimsbf | PTP SECOND FIELD |
|   ptp_nanosecond_field | 32 | uimsbf | PTP NANOSECOND FIELD |
| } | | | |
| if(utc_offset_metadata_indicator==1) { | | | |
|   utc_offset_metadata | 32 | uimsbf | UTC METADATA |
| } | | | |
| } | | | |

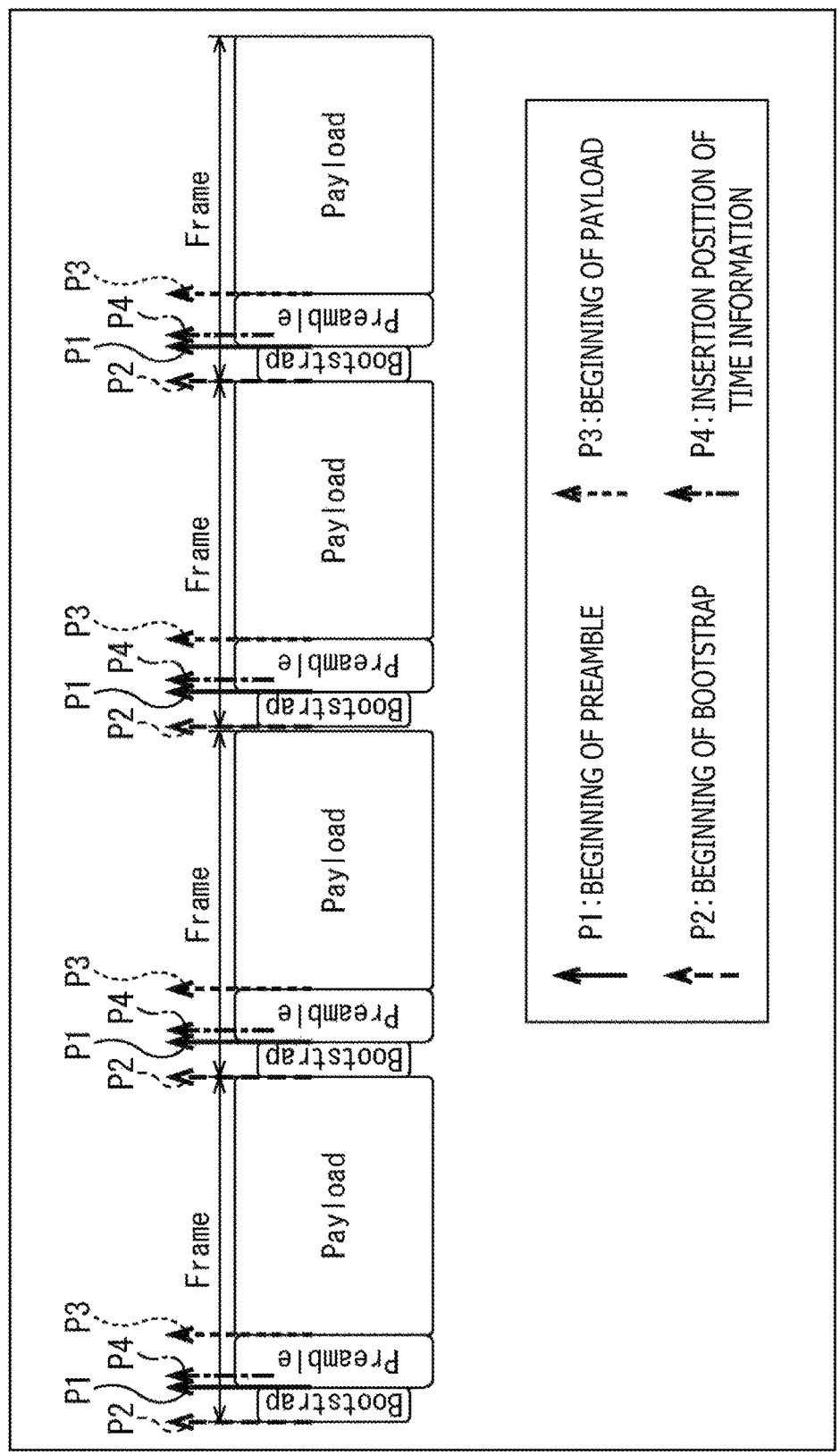

RECEPTION APPARATUS AND DATA PROCESSING METHOD

TECHNICAL FIELD

The present technology relates to a reception apparatus and a data processing method and, in particular, to a reception apparatus and a data processing method that permit efficient processing of time information.

BACKGROUND ART

For example, it has been decided that UDP/IP, i.e., a scheme using IP (Internet Protocol) packet including UDP (User Datagram Protocol) packet (hereinafter referred to as an IP transport scheme) will be primarily employed in ATSC (Advanced Television System Committee) 3.0, which is one of the next-generation terrestrial broadcasting standards, for data transport. Also, expectations are high that an IP transport scheme will be employed not only in ATSC3.0 but also in other broadcasting schemes in the future.

It should be noted that when TS is broadcast, PCR (Program Clock Reference) is transported as time information for achieving synchronism between the sending and receiving sides (refer, for example, to NPL 1).

CITATION LIST

Non Patent Literature

[NPL 1]
ARIB STD-B44 2.0 Edition, Association of Radio Industries and Businesses

SUMMARY

Technical Problem

Incidentally, a scheme for processing time information to achieve synchronism between the sending and receiving sides has yet to be established in an IP transport scheme, and requests have been made for proposals to efficiently process time information.

The present technology has been devised in light of the foregoing, and it is an object of the present technology to efficiently process time information.

Solution to Problem

A reception apparatus according to an aspect of the present technology is a reception apparatus that includes a reception section, an acquisition section, a conversion section, and an output section. The reception section receives a digital broadcasting signal based on an IP transport scheme. The acquisition section acquires time information from a physical layer frame transported in a physical layer of a protocol stack for the IP transport scheme. The conversion section converts the acquired time information into the same data format as data provided in a payload of the physical layer frame. The output section outputs the converted time information to a processing section that performs a given process relating to an upper layer that is a layer higher than the physical layer.

The reception apparatus according to the aspect of the present technology may be an independent apparatus or an internal block making up a single apparatus. Alternatively, a data processing method according to an aspect of the present technology is a data processing method that supports the reception apparatus according to the aspect of the present technology.

In the reception apparatus and the data processing method according to an aspect of the present technology, a digital broadcasting signal based on an IP transport scheme is received, time information is acquired from a physical layer frame transported in a physical layer of a protocol stack for the IP transport scheme, the acquired time information is converted into the same data format as data provided in a payload of the physical layer frame, and the converted time information is output to a processing section that performs a given process relating to an upper layer that is a layer higher than the physical layer.

Advantageous Effect of Invention

According to an aspect of the present invention, time information can be efficiently processed.

It should be noted, however, that the effect described herein is not necessarily limited and may be any one of the effects described in the present disclosure.

BRIEF DESCRIPTION OF DRAWINGS

FIG. 9 is a diagram illustrating a configuration example of PTP.

FIG. 10 is a diagram illustrating an example of syntax of UTC metadata.

FIG. 14 is a diagram illustrating an example of a packet type.

FIG. 17 is a diagram illustrating an example of a data format when time information is transported using an IP/UDP packet.

FIG. 18 is a diagram illustrating an example of a time reference point in a physical layer frame.

DESCRIPTION OF EMBODIMENT

A description will be given below of an embodiment of the present technology with reference to drawings. It should be noted that the description will be given in the following order.

1. System Configuration
2. Transport of Time Information Included in Physical Layer Frame
3. Conversion of Format of Time Information Transported from Physical Layer to Upper Layer
4. Output Timing of Packet Including Time Information
5. Processing Flow on Receiving Side
6. Computer Configuration <1. System Configuration>
(Configuration Example of Transport System)

Figure 1:
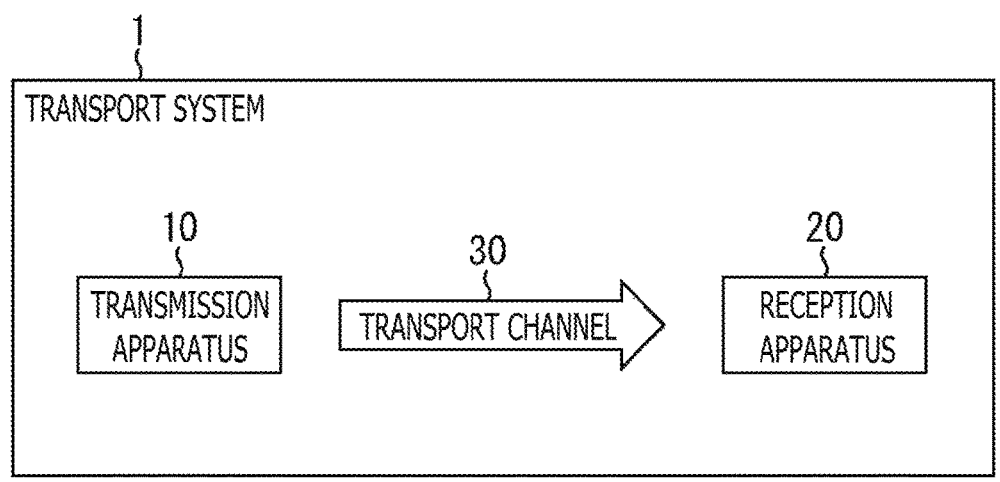
FIG. 1 is a diagram illustrating a configuration of an embodiment of a transport system to which the present technology is applied.

FIG. 1 is a diagram illustrating a configuration of an embodiment of a transport system to which the present technology is applied. It should be noted that the term "system" refers to a logical set of a plurality of apparatuses.

In FIG. 1, a transport system 1 includes a transmission apparatus 10 and a reception apparatus 20. In this transport system 1, data transport compliant with a digital broadcasting standard adopting ATSC3.0 or other IP transport scheme is carried out.

The transmission apparatus 10 transmits content via a transport channel 30. For example, the transmission apparatus 10 transmits a broadcasting stream including video, audio, and so on (and components thereof) making up a television program or other content and signaling as a digital broadcasting signal via the transport channel 30.

The reception apparatus 20 receives content sent from the transmission apparatus 10 via the transport channel 30 and outputs the content. For example, the reception apparatus 20 receives a digital broadcasting signal from the transmission apparatus 10, acquires video, audio, and so on (and components thereof) making up content and signaling from a broadcasting stream, and plays back the video and audio of a television program or other content.

It should be noted that, in the transport system 1, the transport channel 30 may be not only terrestrial broadcasting but also, for example, satellite broadcasting using a broadcasting satellite or communication satellite and wired broadcasting using cables (CATV).

(Configuration Example of Reception Apparatus)

Figure 2:
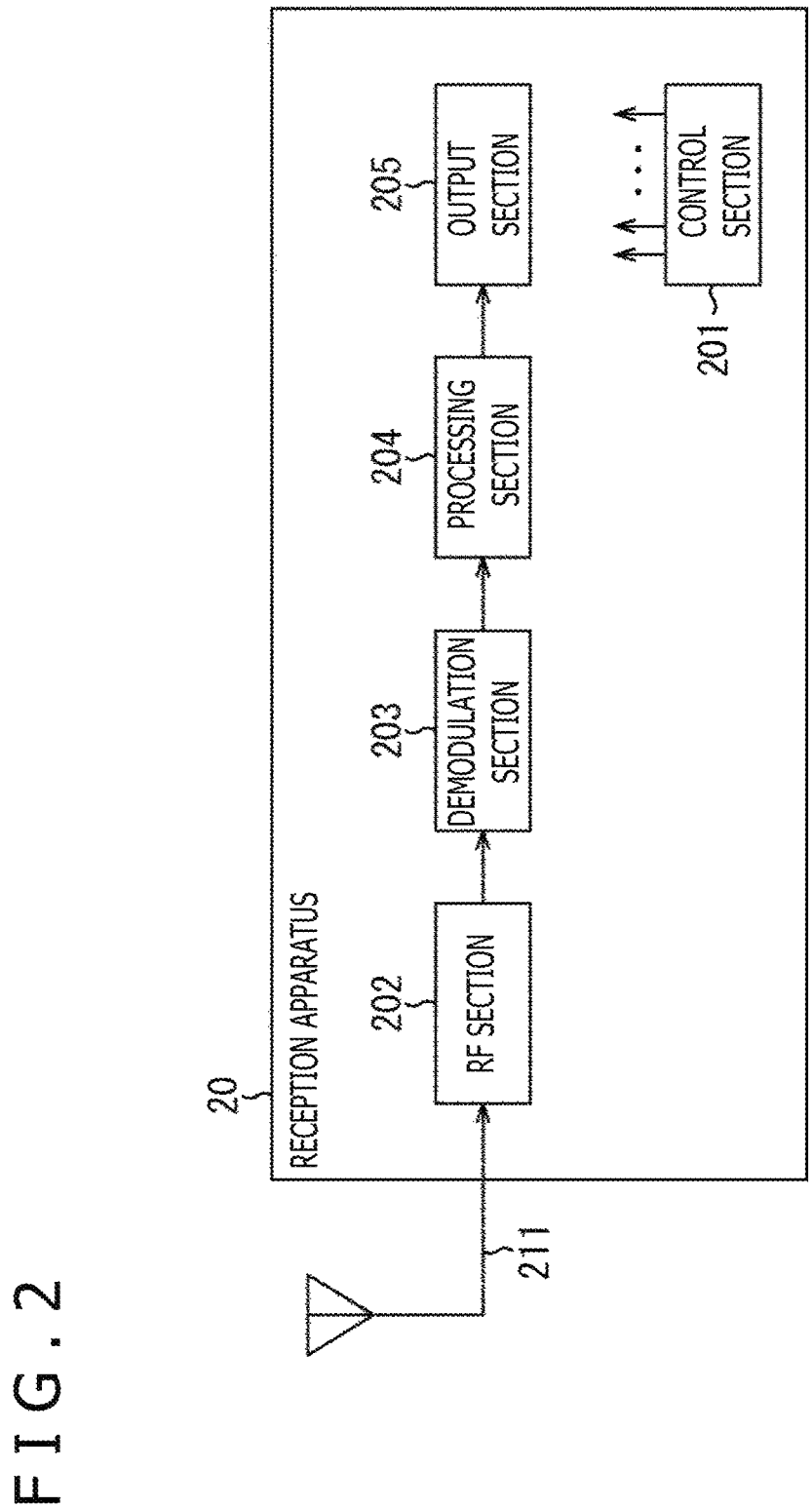
FIG. 2 is a diagram illustrating a configuration example of a reception apparatus.

FIG. 2 is a diagram illustrating a configuration example of the reception apparatus 20 in FIG. 1.

In the reception apparatus 20 illustrated in FIG. 2, a television program or other content is played back as a result of reception of a digital broadcasting signal sent from the transmission apparatus 10 via the transport channel 30 and processing of the signal. In FIG. 2, the reception apparatus 20 includes a control section 201, an RF section 202, a demodulation section 203, a processing section 204, and an output section 205.

The control section 201 controls the operation of the respective sections of the reception apparatus 20.

The RF section 202 receives a digital broadcasting signal via an antenna 211, converts the frequency of an RF (Radio Frequency) signal into an IF (Intermediate Frequency) signal, and supplies the signal to the demodulation section 203. It should be noted that the RF section 202 is configured, for example, as an RF IC.

The demodulation section 203 performs a demodulation process (e.g., OFDM (Orthogonal Frequency Division Multiplexing)) to demodulate the signal supplied from the RF section 202. Also, the demodulation section 203 performs an error correction process to correct the demodulated signal obtained by the demodulation process and supplies the signal obtained as a result of the process to the processing section 204. It should be noted that the demodulation section 203 is configured, for example, as a demodulation LSI (Large Scale Integration).

The processing section 204 performs a process (e.g., decoding process) on the signal supplied from the demodulation section 203 and supplies video and audio data obtained as a result of the process to the output section 205. It should be noted that the processing section 204 is configured, for example, as a main SoC (System on Chip). That is, the demodulation section 203 as a demodulation LSI and the processing section 204 as a main SoC are configured as different chips and connected via a given interface (e.g., signal line).

The output section 205 includes, for example, a display section and a speaker. The display section displays a video that matches with video data supplied from the processing section 204. On the other hand, the speaker outputs audio that matches with audio data supplied from the processing section 204. It should be noted that the output section 205 may output video and audio data, supplied from the processing section 204, to external equipment.

The reception apparatus 20 is configured as described above. It should be noted that the reception apparatus 20 may be not only a stationary receiver such as television receiver, set top box (STB), or recorder but also a mobile receiver such as mobile phone, smartphone, or tablet terminal. Also, the reception apparatus 20 may be vehicle-mounted equipment mounted to a vehicle.

(Configuration Example of Demodulation Section)

Figure 3:
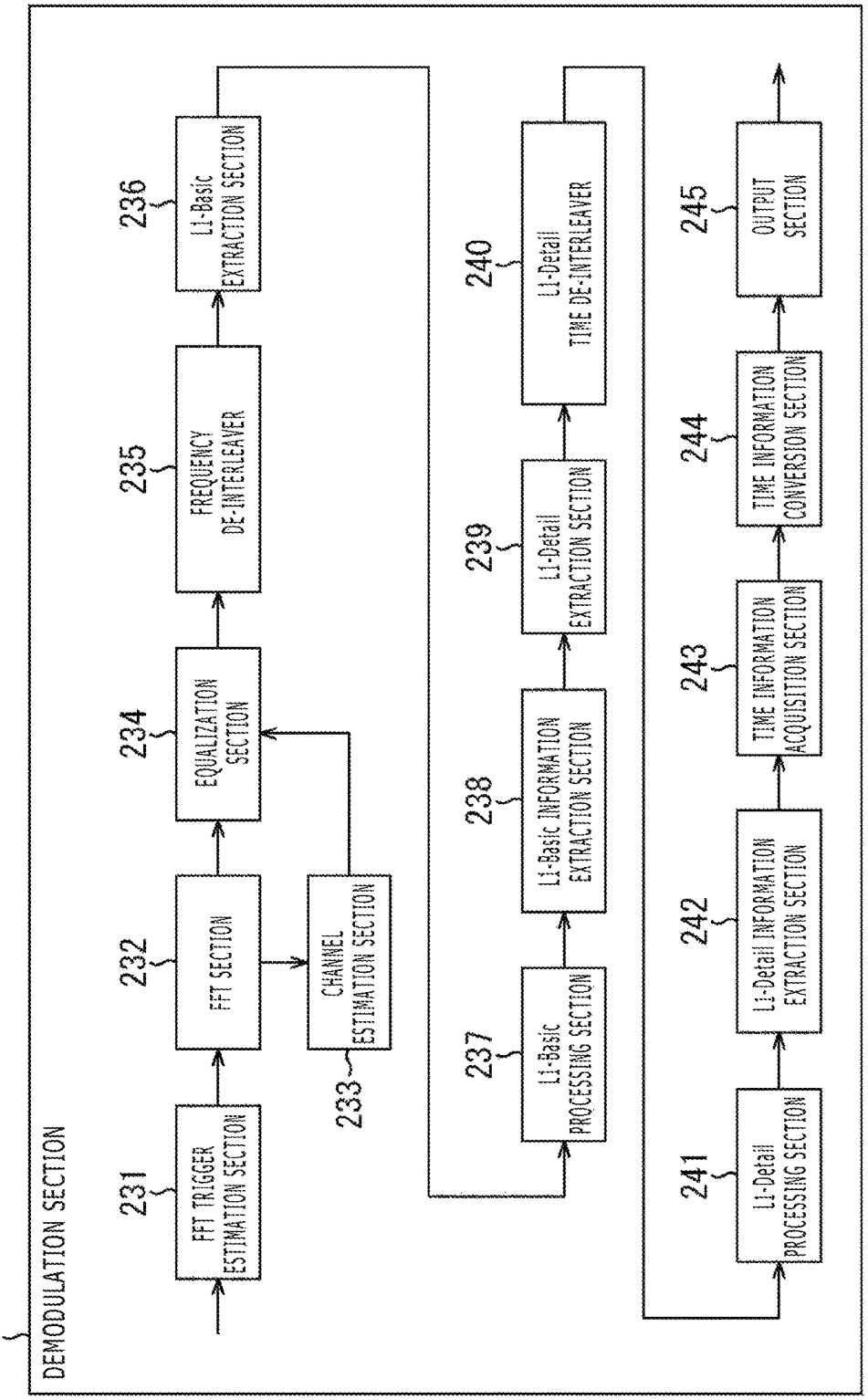
FIG. 3 is a diagram illustrating a detailed configuration example of a demodulation section of the reception apparatus.

FIG. 3 is a diagram illustrating a detailed configuration example of the demodulation section 203 of the reception apparatus 20 in FIG. 2. It should be noted that, in the configuration of the demodulation section 203 illustrated in FIG. 3, the blocks handling processes related to time information transported as signaling in the physical layer are primarily illustrated for simplification of the description.

In FIG. 3, the demodulation section 203 includes an FFT trigger estimation section 231, an FFT section 232, a channel estimation section 233, an equalization section 234, a frequency de-interleaver 235, an L1-Basic extraction section 236, an L1-Basic processing section 237, an L1-Basic information extraction section 238, an L1-Detail extraction section 239, an L1-Detail time de-interleaver 240, an L1-Detail processing section 241, an L1-Detail information extraction section 242, a time information acquisition section 243, a time information format conversion section 244, and an output section 245.

In the demodulation section 203, a signal (IF signal) from the RF section 202 is converted from an analog signal into a digital signal, followed by removal of DC components. Then, the signal is subjected to digital quadrature demodulation, and a baseband OFDM signal obtained as a result thereof is output. This baseband OFDM signal is a signal in time domain before FFT computation, and this OFDM signal before FFT computation will be hereinafter also referred to as an OFDM time domain signal.

It should be noted that an OFDM time domain signal is a complex signal represented by a complex number that includes an in-phase component ((I) component) and a quadrature phase component ((Q) component) resulting from quadrature demodulation.

The FFT trigger estimation section 231 finds an autocorrelation (guard correlation) of the OFDM time domain signal, estimates an FFT trigger indicating a computation start timing that matches with an FFT computation range, and supplies the trigger to the FFT section 232.

The FFT section 232 extracts an OFDM time domain signal (sample value thereof) during an FFT interval from the OFDM time domain signal according to the FFT trigger from the FFT trigger estimation section 231 and performs FFT computation, fast computation of DFT (Discrete Fourier Transform).

It should be noted that the OFDM signal obtained by the FFT computation of the OFDM time domain signal is a frequency domain signal, and this OFDM signal after FFT computation will be hereinafter also referred to as an OFDM frequency domain signal. This OFDM frequency domain signal is supplied to the channel estimation section 233 and the equalization section 234.

The channel estimation section 233 performs channel estimation that estimates the transport channel characteristic, a frequency characteristic of the transport channel 30 through which the OFDM signal is transported based on an SP (Scattered Pilots) signal extracted from the OFDM frequency domain signal, and supplies the estimation result to the equalization section 234.

The equalization section 234 performs, as an equalization process, distortion correction that corrects the distortion undergone by the OFDM signal in the transport channel 30 by computing the OFDM frequency domain signal supplied from the FFT section 232 using the estimated value of the transport channel characteristic supplied from the channel estimation section 233. The OFDM frequency domain signal after the distortion correction is supplied to the frequency de-interleaver 235.

Figure 4:
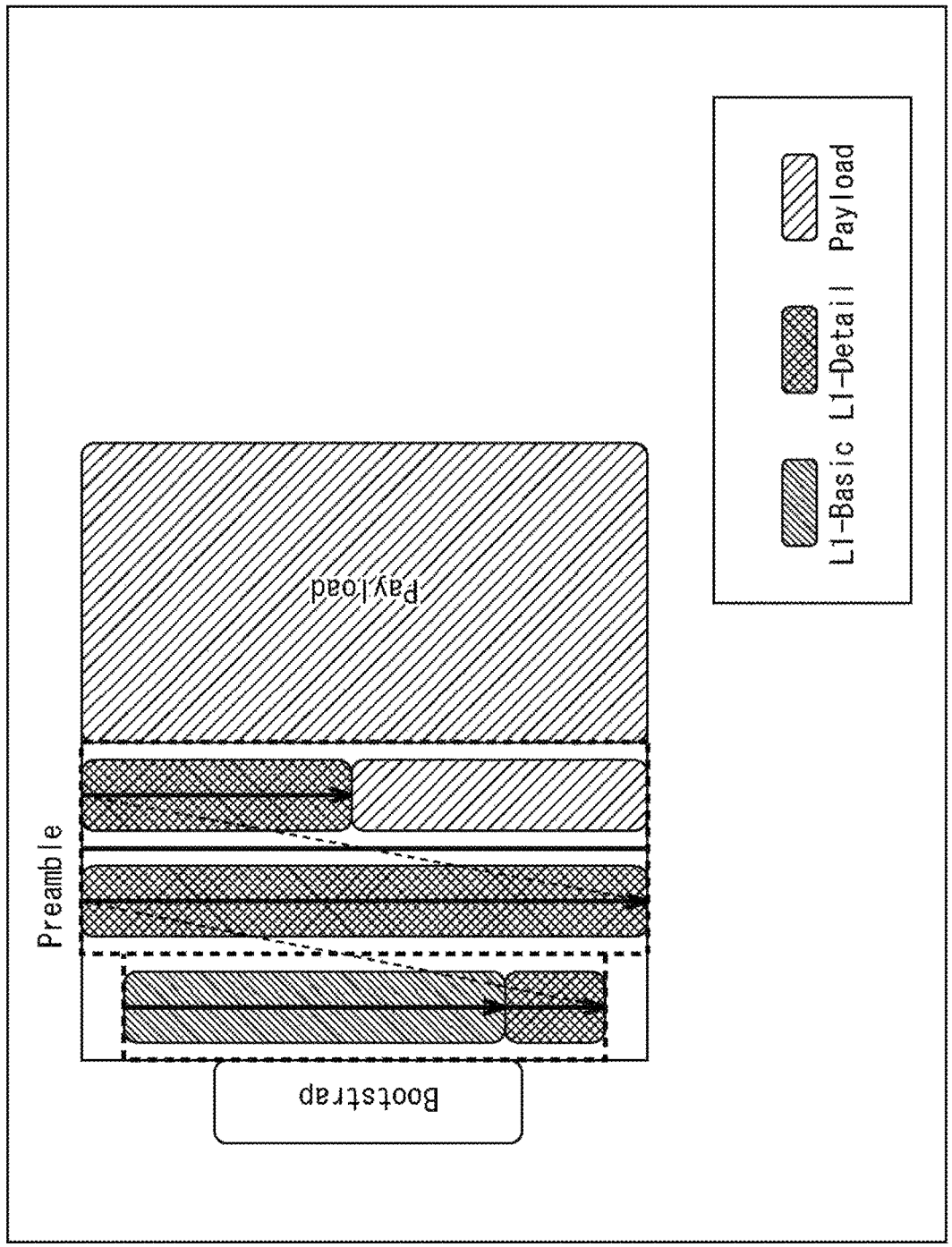
FIG. 4 is a diagram illustrating a configuration example of a physical layer frame.

The frequency de-interleaver 235 performs frequency de-interleaving of the data from the equalization section 234 on a symbol-by-symbol basis and supplies the data to the L1-Basic extraction section 236 and the L1-Detail extraction section 239. It should be noted that, as illustrated in FIG. 4, a preamble making up a physical layer frame includes symbols such as L1-Basic, L1-Detail, and Payload.

The L1-Basic extraction section 236 extracts a preamble's L1-Basic symbol from the data supplied from the frequency de-interleaver 235 and supplies the symbol to the L1-Basic processing section 237. The L1-Basic processing section 237 performs BICM (Bit-Interleaved Coded Modulation) or de-scrambling process on the data supplied from the L1-Basic extraction section 236 and supplies the data to the L1-Basic information extraction section 238. The L1-Basic information extraction section 238 extracts L1-Basic information from the data supplied from the L1-Basic processing section 237.

This L1-Basic information is 200-bit fixed length data (signaling). It should be noted that L1-Basic information is required to extract L1-Detail information.

The L1-Detail extraction section 239 extracts a preamble's L1-Detail symbol from the data supplied from the frequency de-interleaver 235 and supplies the data to the L1-Detail time de-interleaver 240. The L1-Detail time de-interleaver 240 performs time de-interleaving of the data supplied from the L1-Detail extraction section 239 and supplies the data to the L1-Detail processing section 241.

The L1-Detail processing section 241 performs BICM (Bit-Interleaved Coded Modulation) or de-scrambling process on the data supplied from the L1-Detail time de-interleaver 240 and supplies the data to the L1-Detail information extraction section 242. The L1-Detail information extraction section 242 extracts L1-Detail information from the data supplied from the L1-Detail processing section 241.

This L1-Detail information is variable length data (signaling). Also, time information (and metadata thereof) indicating the beginning of a preamble or the like in a physical layer frame can be included in L1-Detail information. L1-Detail information including this time information is supplied to the time information acquisition section 243.

The time information acquisition section 243 acquires time information included in the L1-Detail information supplied from the L1-Detail information extraction section 242 and supplies the time information to the time information format conversion section 244. The time information format conversion section 244 converts the time information supplied from the time information acquisition section 243 into a given format (same data format as data provided in a payload of a physical layer frame) and supplies the data obtained therefrom (e.g., packet including time information) to the output section 245.

The output section 245 outputs the data supplied from the time information format conversion section 244 (e.g., packet including time information) to the processing section 204 via a given interface (e.g., signal line).

It should be noted that although, in the configuration illustrated in FIG. 3, the blocks handling processes related to time information transported as signaling in the physical layer have been primarily described for simplification of the description, demodulation, error correction and other processes are actually performed on video, audio, and other transport media, and packets including such data are output to the processing section 204 via a given interface.

Figure 5:
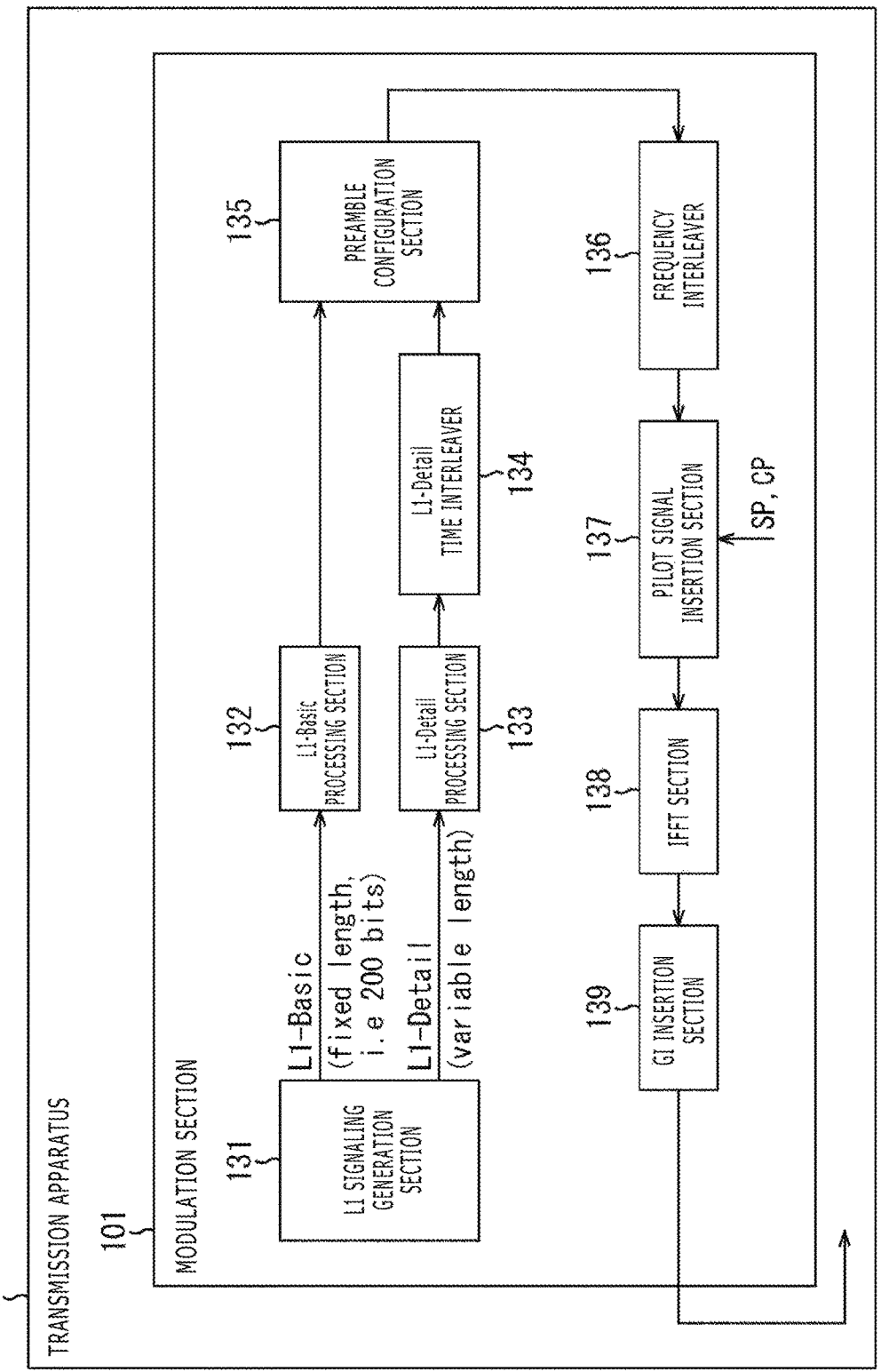
FIG. 5 is a diagram illustrating a detailed configuration example of a modulation section of a transmission apparatus.

Also, FIG. 5 illustrates a configuration of a modulation section 101 of the transmission apparatus 10 that corresponds to the demodulation section 203 of the reception apparatus 20 illustrated in FIG. 3. In FIG. 5, L1-Basic information generated by an L1 signaling generation section 131 is processed by an L1-Basic processing section 132 and supplied to a preamble configuration section 135. Also, L1-Detail information generated by the L1 signaling generation section 131 is processed by an L1-Detail processing section 133, time interleaved by an L1-Detail time interleaver 134, and supplied to the preamble configuration section 135. It should be noted, however, that time information (and metadata thereof) can be included in this L1-Detail information.

In the preamble configuration section 135, a preamble includes L1-Basic information and L1-Detail information. The preamble configured by the preamble configuration section 135 is frequency interleaved by a frequency interleaver 136, followed by insertion of SP (Scattered Pilots) signals and CP (Continual Pilots) signals by a pilot signal insertion section 137 and IFFT computation by an IFFT section 138, after which the preamble is supplied to a GI insertion section 139. Then, a guard interval (GI) is inserted by a GI insertion section 139, and a digital broadcasting signal including the signal obtained as a result thereof is sent via the transport channel 30.

<2. Transport of Time Information Included in Physical Layer Frame>

Incidentally, ATSC3.0 assumes transport of time information indicating the beginning of a preamble or the like in a physical layer frame as physical layer signaling. This time information represents absolute time of a given position (time reference point) in a stream of a physical layer frame.

Here, the time of a given position in a stream is the time at a given moment in the middle of processing by the transmission apparatus 10. A given moment of the bit at a given position in the middle of given by the transmission apparatus 10 is, for example, the time at the moment when the bit at a given position is output from a certain block of the transmission apparatus 10 or the time at the moment when the bit at a given position is processed by a certain block of the transmission apparatus 10.

PTP (Precision Time Protocol), for example, can be used as this time information. Although described later, PTP is 80-bit information representing time defined by IEEE 1588-2008. It should be noted that time information is not limited to PTP and that arbitrary time information such as time information defined by a given standard or time information in an originally determined format can be used.

(Time Reference Point in Physical Layer Frame)

Figure 6:
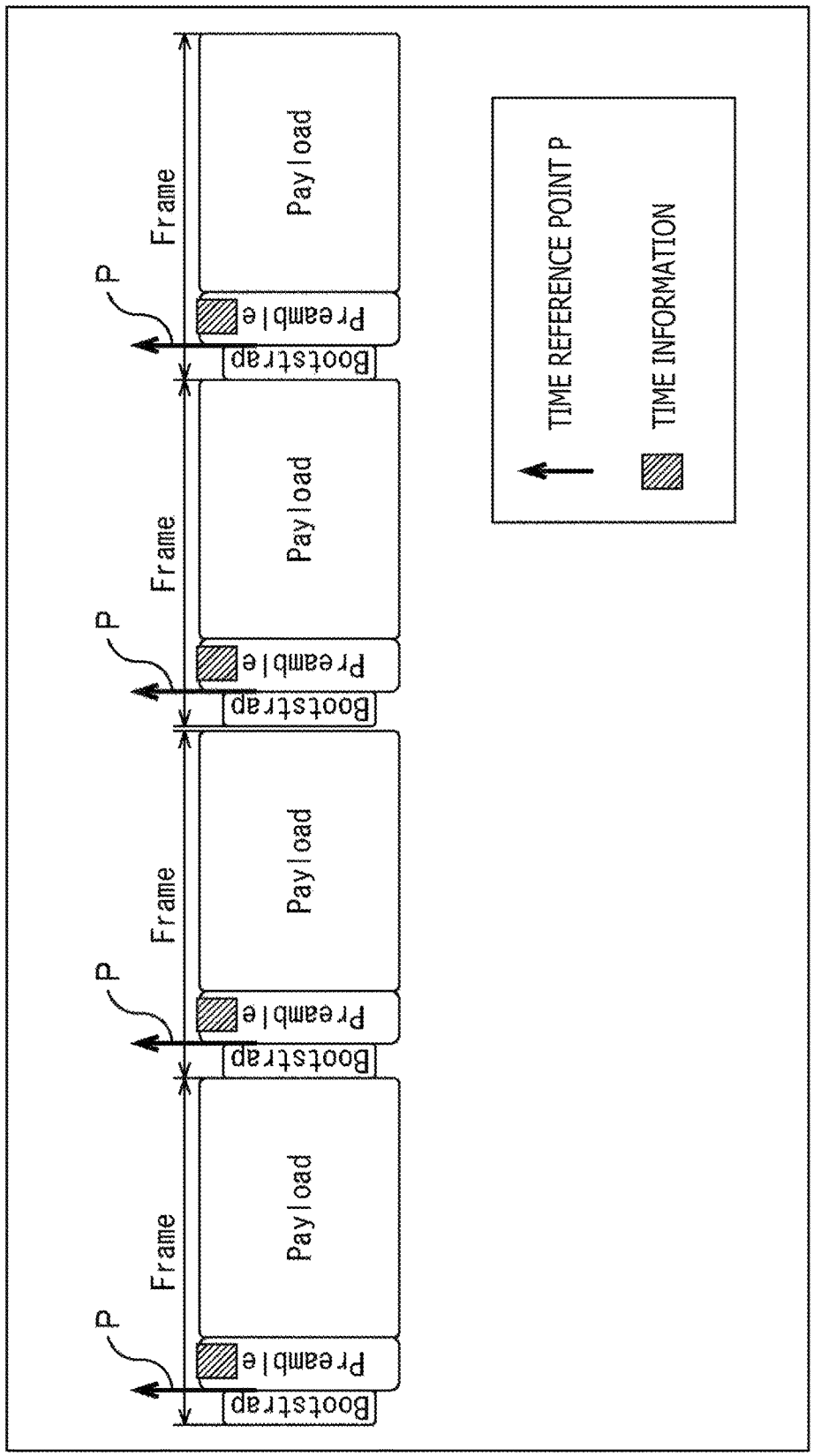
FIG. 6 is a diagram describing a time reference point in a physical layer frame.

FIG. 6 is a diagram describing a time reference point in a physical layer frame. It should be noted that the direction of time is from left to right in FIG. 6.

In FIG. 6, each physical layer frame includes a bootstrap, a preamble, and a payload. Also, the space (interval) between the physical layer frames is constant.

Signaling (L1 signaling) can be provided in a bootstrap or a preamble. In this example, time information such as PTP is provided as preamble signaling. Here, time information (PTP) provided in a preamble (signaling thereof) is a time reference point P indicating the beginning of the preamble.

For example, time information (PTP) provided in the preamble (signaling thereof) of the first physical layer frame indicates the time reference point P at the beginning of the preamble of the first physical layer frame. Similarly, in the subsequent physical layer frames, time information (PTP) provided in each preamble (signaling thereof) indicates the time reference point P at the beginning of the preamble.

Data stored in an ALP (ATSC Link-layer Protocol) packet or an IP/UDP packet is provided in a payload. An ALP packet is a layer 2 (L2) transport packet (L2 Packet), and an IP/UDP packet is provided in the payload thereof. Video, audio, signaling, and other data are provided in the payload of an IP/UDP packet.

It should be noted that the position indicated by the time reference point P that matches with time information (PTP) is not limited to the beginning of a preamble illustrated in FIG. 6, and other position such as the beginning of a bootstrap, the beginning of a payload, or the insertion location of time information may be specified as long as it is a position that can serve as a time reference point (position that can serve as a delimitation between data). It should be noted, however, that time information is inserted at a position inside a preamble in the example illustrated in FIG. 6.

Figure 7:
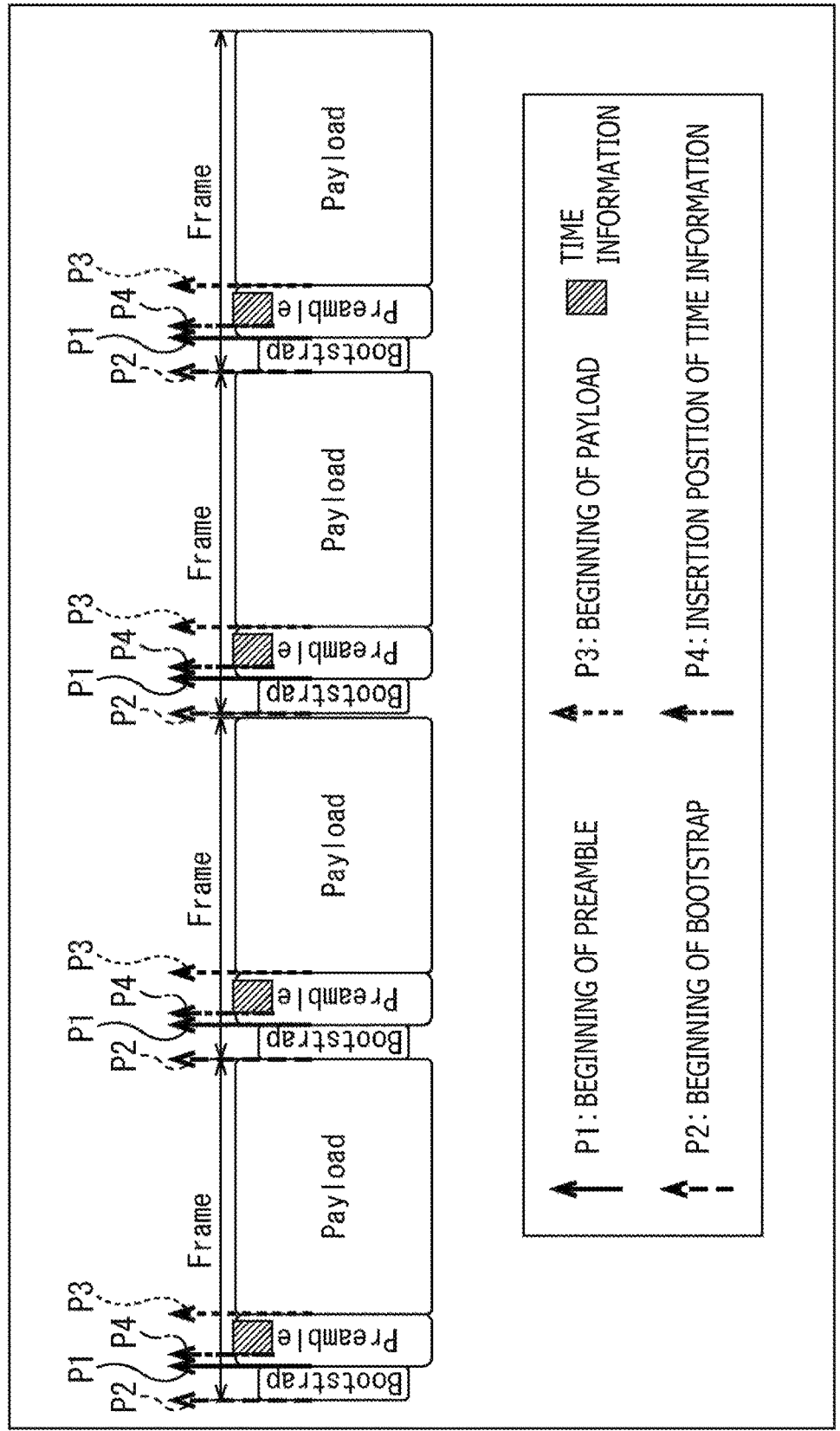
FIG. 7 is a diagram illustrating an example of a time reference point in a physical layer frame.

FIG. 7 is a diagram illustrating an example of the time reference point P. In FIG. 7, for example, time information (PTP) provided in the preamble (signaling thereof) of the first physical layer frame can indicate not only the time reference point P1 at the beginning of the preamble of the first physical layer frame but also a time reference point P2 at the beginning of the bootstrap, a time reference point P3 at the beginning of the payload, or a time reference point P4 at the insertion location of time information.

Also, in the subsequent physical layer frames, time information (PTP) provided in each preamble (signaling thereof) indicates the time reference point P at the beginning of the preamble, at the beginning of the bootstrap, at the beginning of the payload, or at the insertion location of time information (P1, P2, P3, or P4 in FIG. 7).

It should be noted that although it was described in the example of the physical layer frame illustrated in FIGS. 6 and 7 that signaling including time information is provided in the preamble, signaling may be provided in the bootstrap. In this case, time information (PTP) of the signaling provided in the bootstrap can indicate the time reference point P2 at the beginning of the bootstrap.

Also, time information is not limited to L1 signaling and may be included in other signaling. Further, time information is not limited to PTP, and other information indicating time such as UTC (Coordinated Universal Time) may also be used.

Thus, in the ATSC3.0 physical layer frame, time information (e.g., PTP or UTC) indicating the time reference point P at the beginning of the preamble, at the beginning of the bootstrap, at the beginning of the payload, or at the insertion location of time information is provided in preamble or bootstrap signaling and transported.

(Example of Time Information Transported in Physical Layer)

Figure 8:
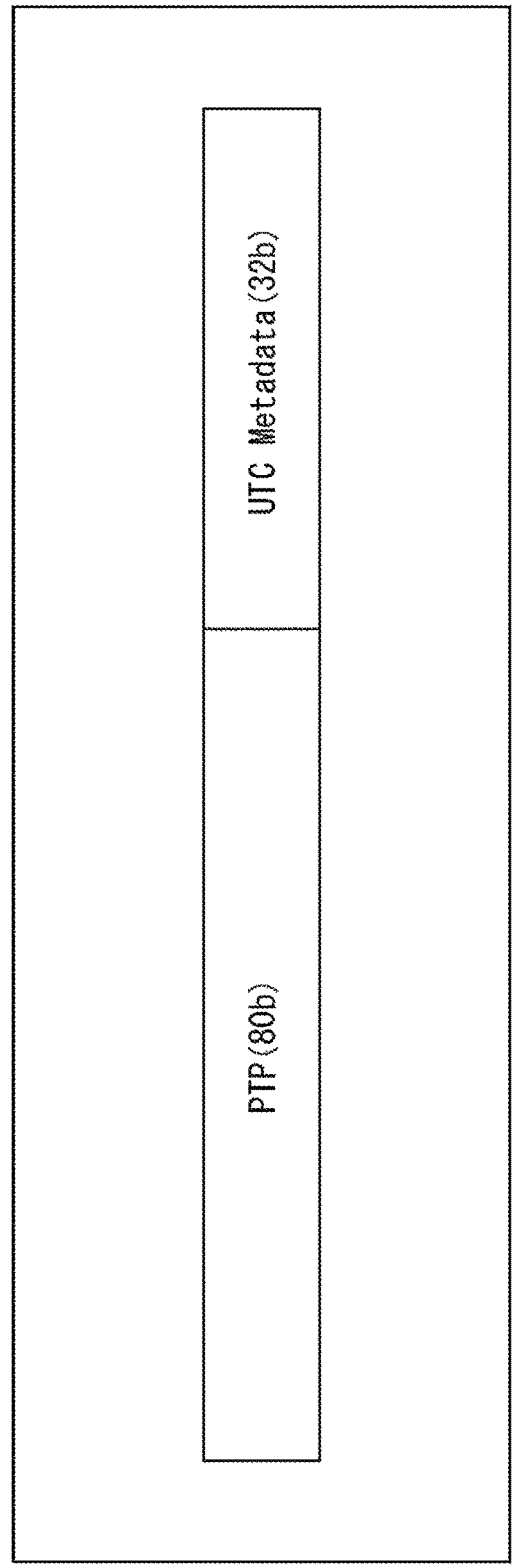
FIG. 8 is a diagram illustrating an example of time information and metadata thereof.

FIG. 8 is a diagram illustrating an example of time information transported in the physical layer.

As illustrated in FIG. 8, time information transported as signaling of the physical layer can be, for example, 80-bit PTP (Precision Time Protocol). Also, 32-bit UTC metadata can be added to this time information (PTP).

(PTP Configuration)

FIG. 9 illustrates a configuration example of PTP defined by IEEE 1588-2008. As illustrated in FIG. 9, of the PTP's 80 bits representing time, 48 bits represent time in seconds, and the remaining 32 bits represent time in nanoseconds. Therefore, time information defined by PTP has sufficient precision as time information included in a physical layer frame and can represent accurate time.

It should be noted that although, as illustrated in FIG. 9, PTP includes a 48-bit second field and a 32-bit nanosecond field, there is no need to use all these fields, and the PTP precision may be reduced by reducing the number of bits used as necessary. That is, PTP can represent extremely accurate time, however, when broadcasting-based services are provided using the transport system 1 illustrated in FIG. 1, transporting time information with higher-than-necessary accuracy puts pressure on the transport bandwidth, resulting in inefficiency.

The 80-bit PTP is exceedingly accurate time information for providing broadcasting-based services, and it is possible to sufficiently maintain provision of broadcasting-based services even if the amount of PTP information is reduced to a certain extent. For this reason, in the transport system 1 illustrated in FIG. 1, PTP as time information can be transported with reduced amount of information. One possible way of reducing the amount of PTP information is to compress PTP.

A possible PTP compression method, for example, is to reduce the 48-bit second field of PTP to 32 bits to allow use up to year 2106 (epoch 1970+136=2106), thereby permitting adjustment to a required value.

Also, in digital broadcasting, 27 MHz or 90 MHz clock (system clock) is common. However, the PTP's nanosecond field for guaranteeing 27 MHz or 90 MHz precision corresponds to 19 or 27 bits. For example, therefore, even if the lower 13 or 5 bits of the 32 bits in the nanosecond field are deleted for reduction to 19 or 27 bits, sufficient precision can be ensured.

It should be noted that, of the 32 bits in the nanosecond field, the upper 2 bits are constantly '0,' it is possible to further delete the upper 2 bits of the 19- or 27-bit nanosecond field whose lower 13 or 5 bits have been deleted so as to obtain a 17- or 25-bit nanosecond field.

It should be noted, however, that ATSC3.0 assumes that when PTP is used, the 48 bits of the second field are adjusted (compressed) to 32 bits and the 32 bits of the nanosecond field are adjusted (compressed) to 19 or 27 bits (17 or 25 bits).

(Configuration of UTC Metadata)

On the other hand, UTC metadata includes, for example, offset information such as information for presentation synchronization of transport media such as video and audio. It should be noted that whether to add UTC metadata to time information (PTP) is optional. FIG. 10 illustrates an example of syntax of UTC metadata.

16-bit PTP_UTC_OFFSET is PTP and UTC offset information. PTP_UTC_OFFSET permits specification of the time difference between PTP and UTC in seconds.

It should be noted, however, that UTC (Coordinated Universal Time) has introduced the leap second adjustment that inserts or deletes seconds to guarantee approximate agreement with UT1 (Universal Time) while maintaining the difference from TAI (International Atomic Time) at integer seconds. On the other hand, PTP does not make leap second adjustment. As a result, the PTP_UTC_OFFSET value is changed in response to insertion or deletion of a leap second in UTC.

2-bit LEAP_SECOND_FLAG is a flag for performing a process related to leap second. LEAP_SECOND_FLAG[0], one of the two flags represented by 2-bit LEAP_SECOND_FLAG, is a flag indicating the time when a leap second occurs.

Also, LEAP_SECOND_FLAG[1] is a flag indicating insertion or deletion of a leap second. For example, when "0" is set as LEAP_SECOND_FLAG[1], it indicates that a leap second (one second added) will be inserted. On the other hand, when "1" is set as LEAP_SECOND_FLAG[1], it indicates that a leap second (one second removed) will be deleted.

It should be noted that the remaining 14 bits of the 32-bit UTC metadata are a reserved area for future additions.

A description will be given here of leap second time adjustment using UTC metadata with reference to FIGS. 11 and 12.

Figure 11:
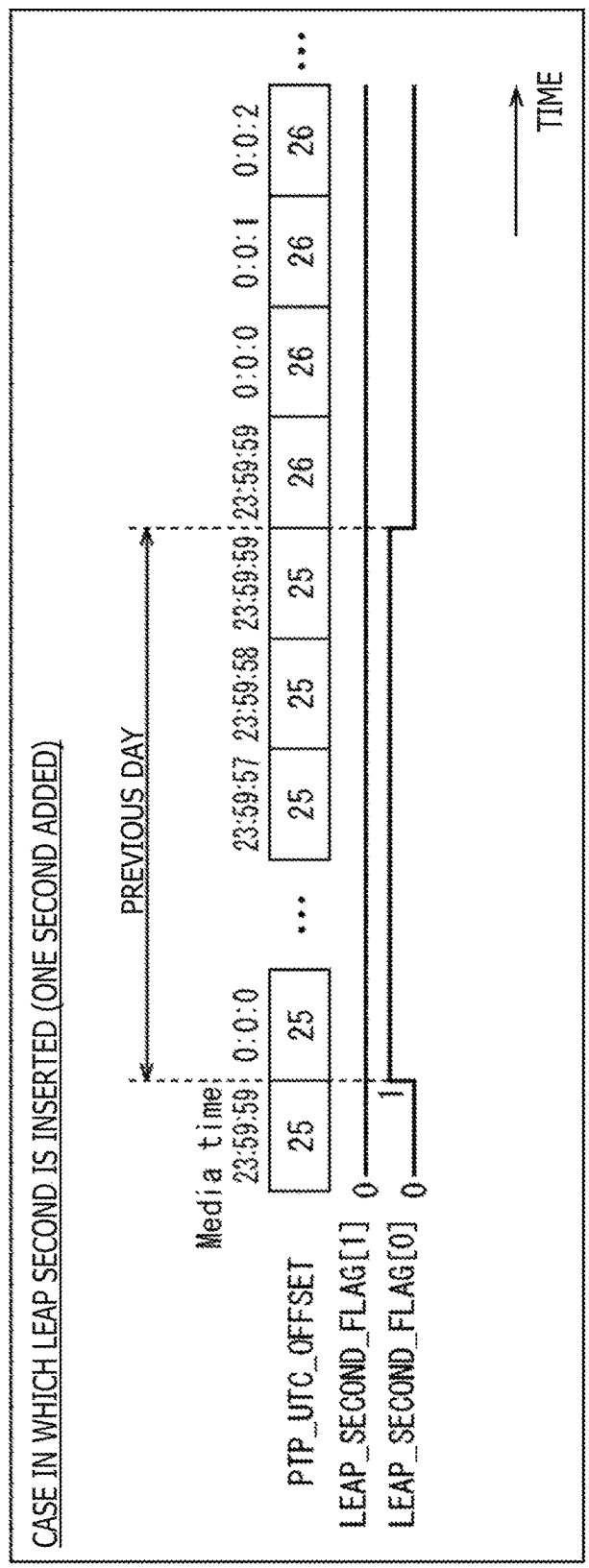
FIG. 11 is a diagram illustrating an example of adjusting time when a leap second is inserted.

FIG. 11 is a diagram illustrating an example of adjusting time when a leap second is inserted (one second added) to the time indicated by UTC.

In FIG. 11, the direction of time is from left to right in the figure. Also, in FIG. 11, the numbers in rectangles (e.g., "25" and "26") represent the time difference between PTP and UTC in seconds set by PTP_UTC_OFFSET.

Further, LEAP_SECOND_FLAG[0] represents the time when a leap second occurs. In this example, a notification is issued about leap second adjustment one day (24 hours) prior to the insertion of a leap second (one second added). Also, LEAP_SECOND_FLAG[1] represents the insertion or deletion of a leap second. In this example, a leap second is inserted (one second added). Therefore, "0" is set as LEAP_SECOND_FLAG[1].

Here, if a leap second is inserted at 23:59:59 on July 1 at the time indicated by UTC, and when the media time (Media time) that corresponds to UTC turns 23:59:59 on June 30, the time difference between PTP and UTC is 25 seconds, and "0" is set as LEAP_SECOND_FLAG[0] because it is not yet one day (24 hours) prior to the leap second adjustment.

One second later when the media time turns 0:0:0 on July 1, it is one day (24 hours) prior to the leap second adjustment. Therefore, LEAP_SECOND_FLAG[0] changes from "0" to "1." As a result, the reception apparatus 20 is notified that the leap second adjustment process will be conducted within 24 hours.

Then, this state continues until the media time turns 23:59:59 on July 1. When the media time turns 23:59:59 on July 1, a leap second is inserted (one second added) into the time indicated by UTC, and in response thereto, the value indicating the time difference between PTP and UTC set by the PTP_UTC_OFFSET is adjusted from 25 seconds to 26 seconds.

Figure 12:
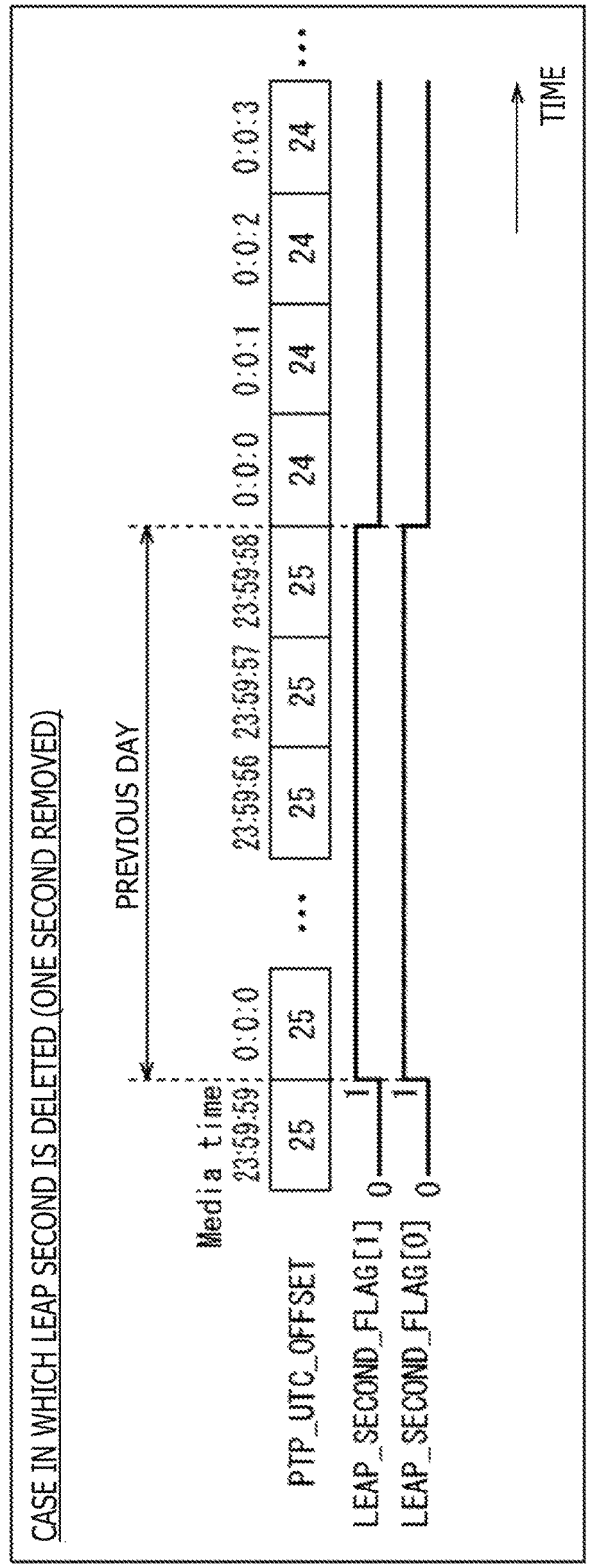
FIG. 12 is a diagram illustrating an example of adjusting time when a leap second is deleted.

Also, FIG. 12 is a diagram illustrating an example of adjusting time when a leap second is deleted (one second removed) from the time indicated by UTC.

It should be noted that, in FIG. 12, the notations of PTP_UTC_OFFSET, LEAP_SECOND_FLAG[0], and LEAP_SECOND_FLAG[1] are the same as in FIG. 11. However, because a leap second is deleted (one second removed) in this example, "1" is set as the LEAP_SECOND_FLAG[1] rather than "0" one day (24 hours) prior to the deletion of a leap second (one second removed).

Here, assuming, for example, that a leap second is deleted from the time indicated by UTC at 23:59:59 on July 1, the time difference between PTP and UTC is 25 seconds when the media time corresponding to UTC turns 23:59:59 on June 30 now, and "0" is set as LEAP_SECOND_FLAG[0] because it is not yet one day (24 hours) prior to the leap second adjustment.

One second later when the media time turns 0:0:0 on July 1, it is one day (24 hours) prior to the leap second adjustment. Therefore, LEAP_SECOND_FLAG[0] and LEAP_SECOND_FLAG[1] change from "0" to "1." As a result, the reception apparatus 20 is notified that the leap second adjustment process will be conducted within 24 hours.

Then, this state continues until the media time turns 23:59:58 on July 1. When the media time turns 23:59:59 on July 1, a leap second is deleted from the time indicated by UTC, and in response thereto, the value indicating the time difference between PTP and UTC set by PTP_UTC_OFFSET is adjusted from 25 seconds to 24 seconds (a leap second is deleted (one second removed)).

It should be noted that although it was described that the reception apparatus 20 is notified that the leap second adjustment process illustrated in FIGS. 11 and 12 will be conducted one day (24 hours) prior to the adjustment, this notification can be made at an arbitrary time according to operation such as three days or half a day prior.

Thus, it is possible to deal with various ways of operation such as leap second adjustment process by adding UTC metadata to time information (PTP).

<3. Conversion of Format of Time Information Transported from Physical Layer to Upper Layer>

As described above, ATSC3.0 assumes that time information such as PTP is transported as signaling of the physical layer. Therefore, a need occurs to transport this time information to an upper layer higher than the physical layer. In the upper layer, a given process is performed using the time information transported from the physical layer. It should be noted, however, that, in the reception apparatus 20, processes in the physical layer are performed by the demodulation section 203 configured as a demodulation LSI and processes in the upper layer are performed by the processing section 204 configured as a main SoC.

In the present technology, this time information provided in a physical layer frame is converted into a given data format processed by the upper layer first and then supplied to the processing section 204, ensuring that the data format of time information transported in the upper layer is the same as data exchanged between the demodulation LSI (demodulation section 203) and the main SoC (processing section 204).

That is, if the format of data exchanged between the demodulation LSI (demodulation section 203) and the main SoC (processing section 204) is not the same (if only time information is in other data format), it will be necessary to use a complicated protocol, for example, to support a plurality of data formats, or the number of pins serving as an interface (I/F) will increase in the demodulation LSI and the main SoC. It is, therefore, desirable to use a common data format.

For this reason, in the present technology, time information acquired from a physical layer frame and transported to the upper layer from the physical layer is stored in an ALP packet, ensuring that the data format of time information and the data format provided in the payload of the physical layer frame are converted into the same data format.

That is, an ALP packet is a layer 2 (L2) transport packet including an IP/UDP packet, and the data stored in the ALP packet is provided in the payload of a physical layer frame. Therefore, it is possible to handle each piece of data in a unified format by storing time information, transported from the physical layer to the upper layer, in the ALP packet.

(Configuration of ALP Packet)

Figure 13:
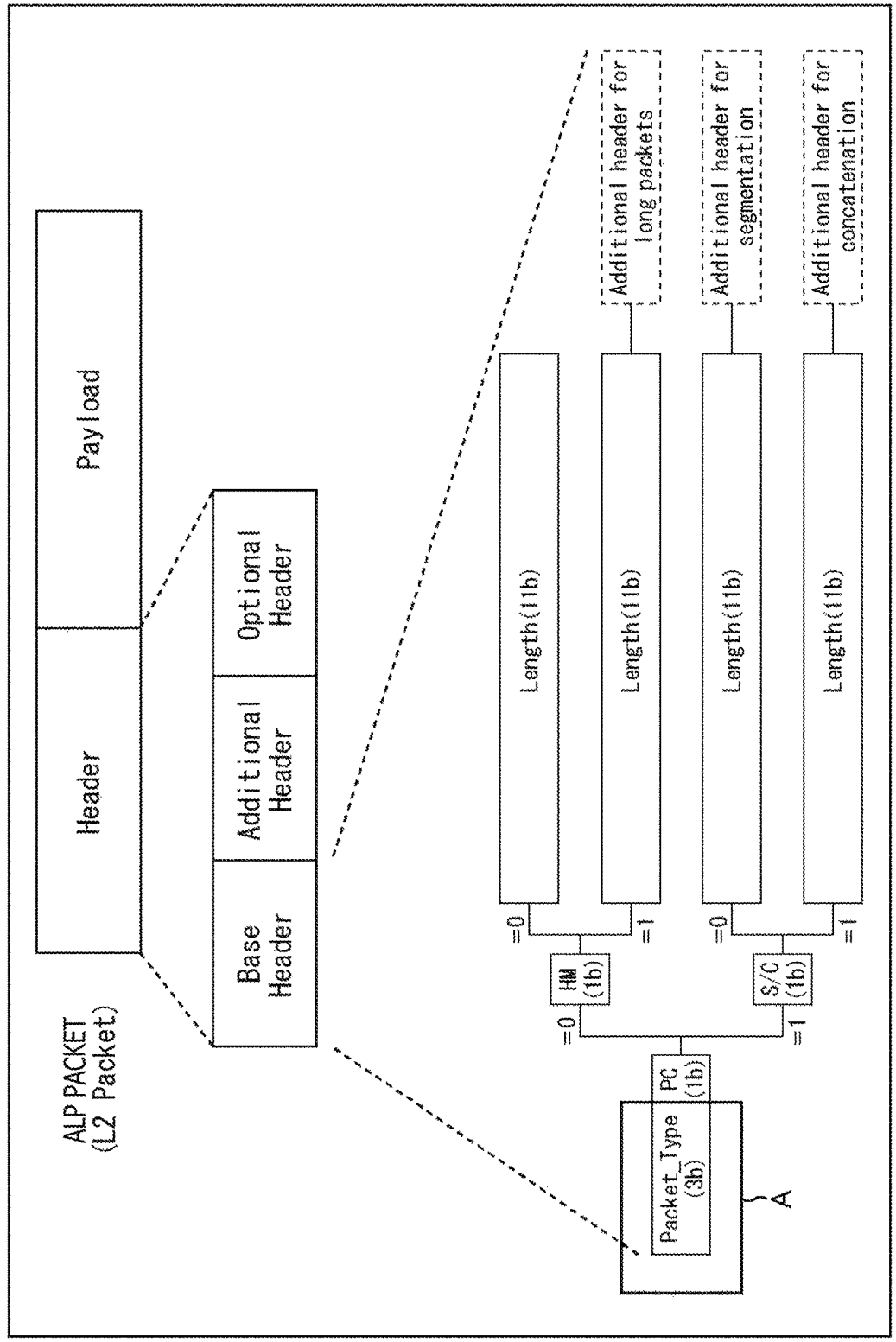
FIG. 13 is a diagram illustrating a configuration example of an ALP packet.

FIG. 13 is a diagram illustrating a configuration example of an ALP packet.

As illustrated in FIG. 13, an ALP packet includes an ALP header and a payload in which data is provided. Also, not only a base header but also an additional header and an optional header can be provided in the ALP header.

3-bit type information (Packet_Type) is set at the beginning of the ALP header. Information about data type provided in the payload of the ALP packet is set as type information enclosed by this frame A as illustrated in FIG. 14.

That is, when an IPv4 IP packet (IP/UDP packet) is provided in the payload, "000" is set as type information. Also, when a compressed IP packet (IP/UDP packet) is provided in the payload, "001" is set as type information. Further, when a TS packet based on the MPEG2-TS scheme is provided in the payload, "010" is set as type information.

Also, when an LLS (Link Layer Signaling) packet is provided in the payload, "100" is set as type information. This LLS packet is a packet for transporting LLS signaling. LLS signaling includes information indicating a configuration of streams and services in a broadcasting network. Also, it is possible to transport, for example, L2 signaling which is layer 2 signaling, using this LLS packet.

It should be noted that type information "011," "101," and "110" in FIG. 14 is reserved for future additions. Also, if additions using three reserved areas are not sufficient, "111" is set to add type information that includes a given area.

Referring back to the description of FIG. 13, type information is followed by 1-bit packet configuration information (PC: Packet Configuration). When "0" is set as packet configuration information, single packet mode is assumed in accordance with 1-bit header mode (HM) provided next, and 11-bit length information (Length) and an additional header are provided in the ALP header.

It should be noted that an ALP packet with no additional header in single packet mode is referred to as a normal packet, whereas an ALP packet with an additional header is referred to as a long packet.

On the other hand, when "1" is set as packet configuration information (PC), segmentation mode or concatenation mode is assumed in accordance with 1-bit S/C (Segmentation/Concatenation) provided next, and 11-bit length information (Length) and an additional header are provided in the ALP header.

Then, in the ALP packet, the ALP header configured as described above is followed by a payload. An IPv4 IP packet (IP/UDP packet) and an LLS packet, for example, can be provided in this payload in accordance with type information of the ALP header (base header).

(Providing Time Information in ALP Packet)

Figure 15:
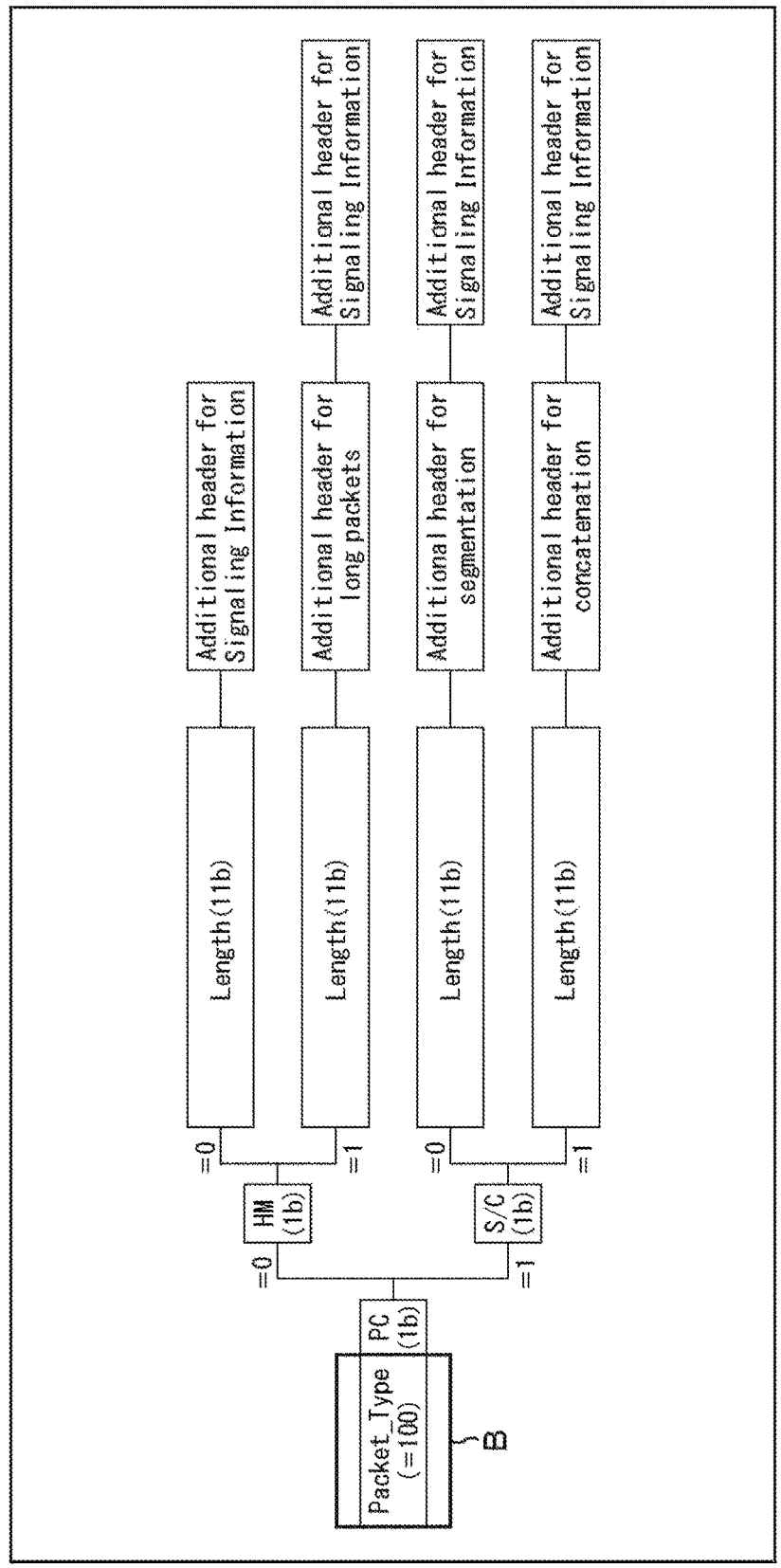
FIG. 15 is a diagram illustrating a configuration example when time information is transported as ALP packet signaling.

FIG. 15 is a diagram illustrating a configuration example of an ALP packet when time information is transported. It should be noted that although FIG. 15 illustrates a configuration of an ALP header of an ALP packet, the configuration thereof is the same as the ALP header (base header) illustrated in FIG. 13. Therefore, the description thereof will be omitted as appropriate.

In the ALP packet illustrated in FIG. 15, "100" indicating LLS packet is set in type information (Packet_Type) provided at the beginning of the ALP header as enclosed by a frame B. Also, in this example, "0" is set as packet configuration information (PC), and "0" is set as header mode (HM) to provide time information in the payload.

Figure 16:
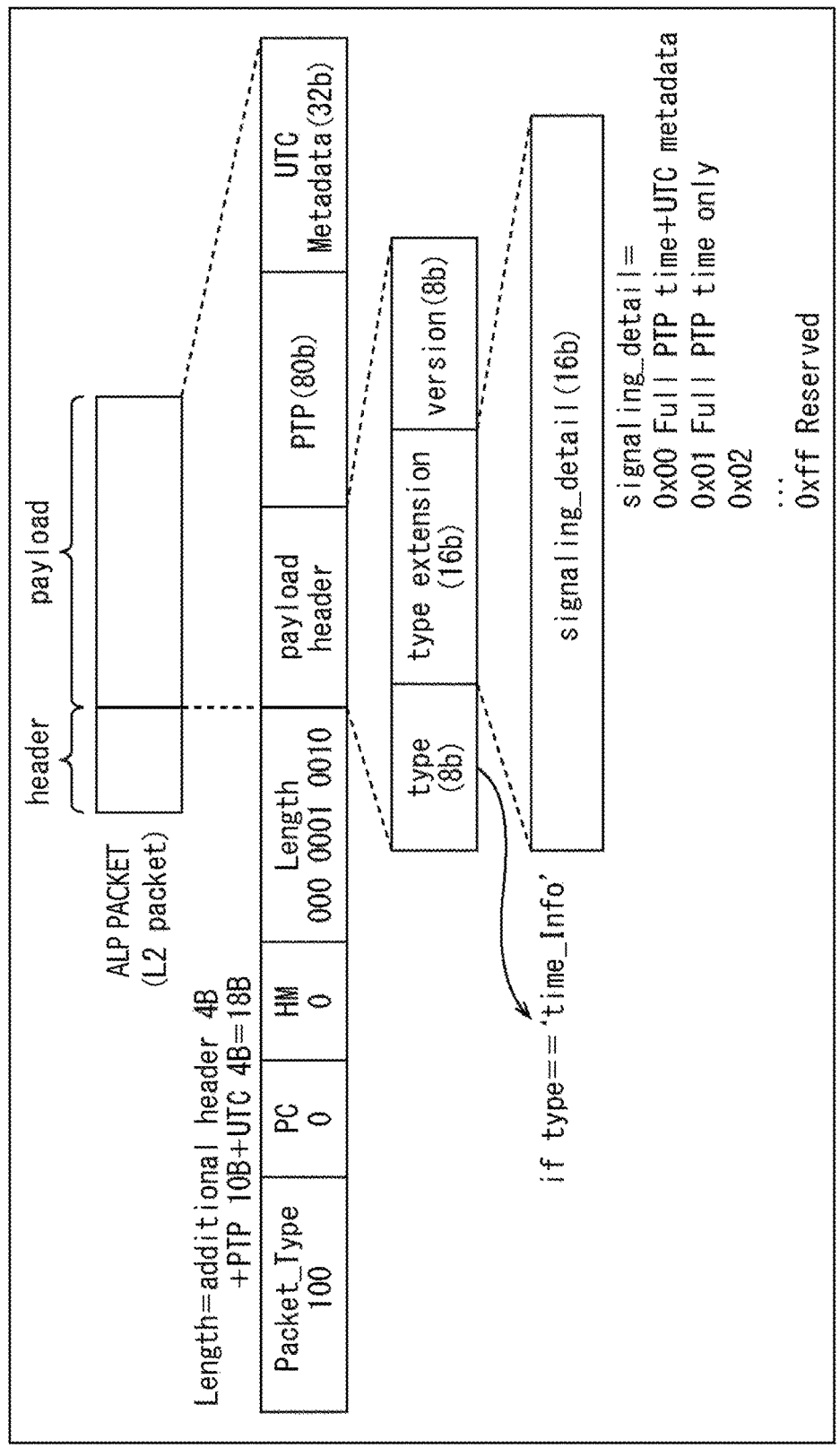
FIG. 16 is a diagram illustrating a configuration example of an ALP header and a payload in an ALP packet.

Here, FIG. 16 illustrates a configuration example of an ALP header and a payload in an ALP packet. In the ALP packet illustrated in FIG. 16, "100" is set as type information (Packet Type), "0" is set as packet configuration information (PC), "0" is set as header mode (HM), and "000 0001 0010" is set as length information (Length).

That is, the ALP packet illustrated in FIG. 16 is an LLS packet as packet type and assumes single packet mode. Therefore, 11-bit length information is provided in the ALP header. In this length information, "000 0001 0010" is set to indicate that the bit length of the payload provided next to the ALP header is 18 bytes.

As this 18-byte payload, a 32-bit payload header is provided in the four bytes from the beginning, and 80-bit time information (PTP) is provided in the succeeding 10 bytes, and 32-bit UTC metadata is provided in the further succeeding four bytes.

The payload header includes 8-bit type information (type), 16-bit additional type information (type extension), and 8-bit version information (version).

Information about data type provided in the payload is set in type information. For example, "type_info" is set as type information in this example, indicating that the payload header is followed by time information (PTP) in the payload.

Detailed signaling information, i.e., detailed information about time information (PTP) that follows the payload header is set in additional type information. For example, when the payload header is followed by time information (PTP) and UTC metadata, "0x00" is set in additional type information. Also, for example, when the payload header is followed by only time information (PTP), "0x01" is set in additional type information. Also, additional type information from "0x02" to "0xff" is a reserved area for future additions.

Versions of time information and UTC metadata can be, for example, set in version information.

The payload header is followed by 80-bit time information (PTP) and 32-bit UTC metadata. Information indicating time such as PTP illustrated in FIG. 9 is used as this time information. Also, UTC metadata is offset information of PTP and UTC as illustrated in FIG. 10.

It should be noted that whether to add UTC metadata to time information (PTP) is optional. When UTC metadata is not added, only time information (PTP) is transported. Also, UTC metadata is an example of metadata added to time information, and other metadata may be added.

Thus, time information (PTP) (and UTC metadata) are provided in the payload of an ALP packet, and the packet is transported from the demodulation LSI (demodulation section 203) that handles processes in the physical layer to the main SoC (processing section 204) that handles processes in the upper layer. This ensures that the data format of time information (PTP) is the same as data exchanged between the demodulation LSI and the main SoC. As a result, exchange of data between the demodulation LSI (demodulation section 203) and the main SoC (processing section 204) does not require a complicated protocol and keeps the pin count unchanged, thereby facilitating processing.
(Conversion of Time Information into Other Format)

Although, in the above description, a case was described in which time information (PTP) is transported from the physical layer to the upper layer using an ALP packet, other transport method may also be used. For example, time information (PTP) may be transported using an IP/UDP packet included in an ALP packet rather than an ALP packet described above.

FIG. 17 is a diagram illustrating an example of a data format when time information (PTP) is transported using an IP/UDP packet.

8-bit table_id is a section ID for transporting time information (PTP). table_id is followed by a 6-bit reserved area.

1-bit ptp_short_format_indicator is a flag indicating the PTP format. For example, "1" is set in ptp_short_format_indicator when a PTP short format is set.

1-bit utc_offset_metadata_indicator is a flag indicating whether UTC metadata is added to time information (PTP). For example, when UTC metadata is added to time information (PTP), "1" is set in utc_offset_metadata_indicator.

When "1" is set in ptp_short_format_indicator, 32-bit ptp_second_field and 17-bit ptp_nanosecond_field are provided. A short format PTP second field is set in 32-bit ptp_second_field. Also, a short format PTP nanosecond field is set in 17-bit ptp_nanosecond_field.

On the other hand, when a value other than "1," i.e., "0," is set as ptp_short_format_indicator, 48-bit ptp_second_field and 32-bit ptp_nanosecond_field are provided. A PTP second field is set in 48-bit ptp_second_field. Also, a PTP nanosecond field is set in 32-bit ptp_nanosecond_field.

When "1" is set as utc_offset_metadata_indicator, utc_offset_metadata is provided in 32 bits. UTC metadata is set in utc_offset_metadata.

Thus, time information (PTP) (and UTC metadata) are provided in the payload of an IP/UDP packet, and the packet is transported from the demodulation LSI (demodulation section 203) to the main SoC (processing section 204). This ensures that the data format of time information (PTP) is the same as data exchanged between the demodulation LSI and the main SoC. As a result, exchange of data between the demodulation LSI (demodulation section 203) and the main SoC (processing section 204) does not require a complicated protocol and keeps the pin count unchanged, thereby facilitating processing.

It should be noted that although, in the above description, a case was described in which time information (PTP) (and UTC metadata) is provided in an ALP packet or an IP/UDP packet as a data format for transportation from the physical layer to the upper layer, the data format is not limited thereto and other data format may also be used as long as time information (PTP) can be converted into the same data format as data provided in the payload of a physical layer frame.

<4. Output Timing of Packet Including Time Information>

A description will be given next of an output timing of an ALP packet including time information (PTP) transported from the demodulation LSI (demodulation section 203) and the main SoC (processing section 204) with reference to FIGS. 18 to 20.

Here, time information (PTP) represents absolute time of a given position (time reference point P) in a stream of a physical layer frame. Then, this information is transported from the physical layer to the upper layer to render this time reference point meaningful as time information. However, if jitter is introduced during transport, this may cause an error in the time indicated by time information (PTP).

For this reason, in the present technology, the output timing of ALP packets including time information (PTP) is maintained constant based on the ATSC3.0 physical layer frame structure, eliminating jitter and ensuring freedom from error in the time indicated by time information (PTP). That is, the frame period is constant among physical layer frames. Therefore, an ALP packet including time information (PTP) using this is output at a constant timing.

Here, FIG. 18 illustrates an example of the time reference point P in an ATSC3.0 physical layer frame. That is, as illustrated in FIG. 18, the time reference point P is present, for example, at four locations, namely, at the beginning of the preamble (P1), at the beginning of the bootstrap (P2), at the beginning of the payload (P3), and at the insertion location of time information (P4) in an ATSC3.0 physical layer frame.

However, although, in this example, the insertion location of time information (PTP) when time information (PTP) is transported by the preamble is illustrated as the time reference point P4, if time information (PTP) is transported by the bootstrap, the time reference point P4 indicates the position that matches with the insertion location of time information (PTP) in the bootstrap.

Then, an ALP packet including time information (PTP) is output one at a time for each physical layer frame in step with one of these four time reference points P. It should be noted that even if some jitter is present in the ALP packet storing data other than time information (PTP), the ALP packet including time information (PTP) is output in step with the time reference point P so as to keep at least the ALP packet including time information (PTP) free from jitter.

For example, when the time reference point P2 at the beginning of the bootstrap is used, an ALP packet including time information (PTP) is output in step with the time reference point P2 in each physical layer frame. As a result, an ALP packet including time information (PTP) is output every one frame worth of interval (frame period).

That is, the time reference points P2 in the physical layer frames are at the same interval (one frame worth of interval). By taking advantage of this, it is possible to maintain constant the output timing of ALP packets including time information (PTP) output from the demodulation LSI (demodulation section 203) to the main SoC (processing section 204). Here, for example, a packet at the beginning of each frame becomes an ALP packet including time information (PTP), and the output timing of the ALP packet including time information (PTP) is maintained constant.

A description will be given here of details of data transported between the demodulation LSI (demodulation section 203) and the main SoC (processing section 204). For comparison with data transport in the reception apparatus 20 illustrated in FIG. 2, however, data transport in an ordinary reception apparatus 20A will be described first, followed by the description of data transport in the reception apparatus 20 in FIG. 2. It should be noted, however, that a series of processes of storing time information (PTP) acquired from a physical layer frame in an ALP packet and outputting the packet at a constant timing are not performed in the ordinary reception apparatus 20A as in the reception apparatus 20 illustrated in FIG. 2.

Figure 19:
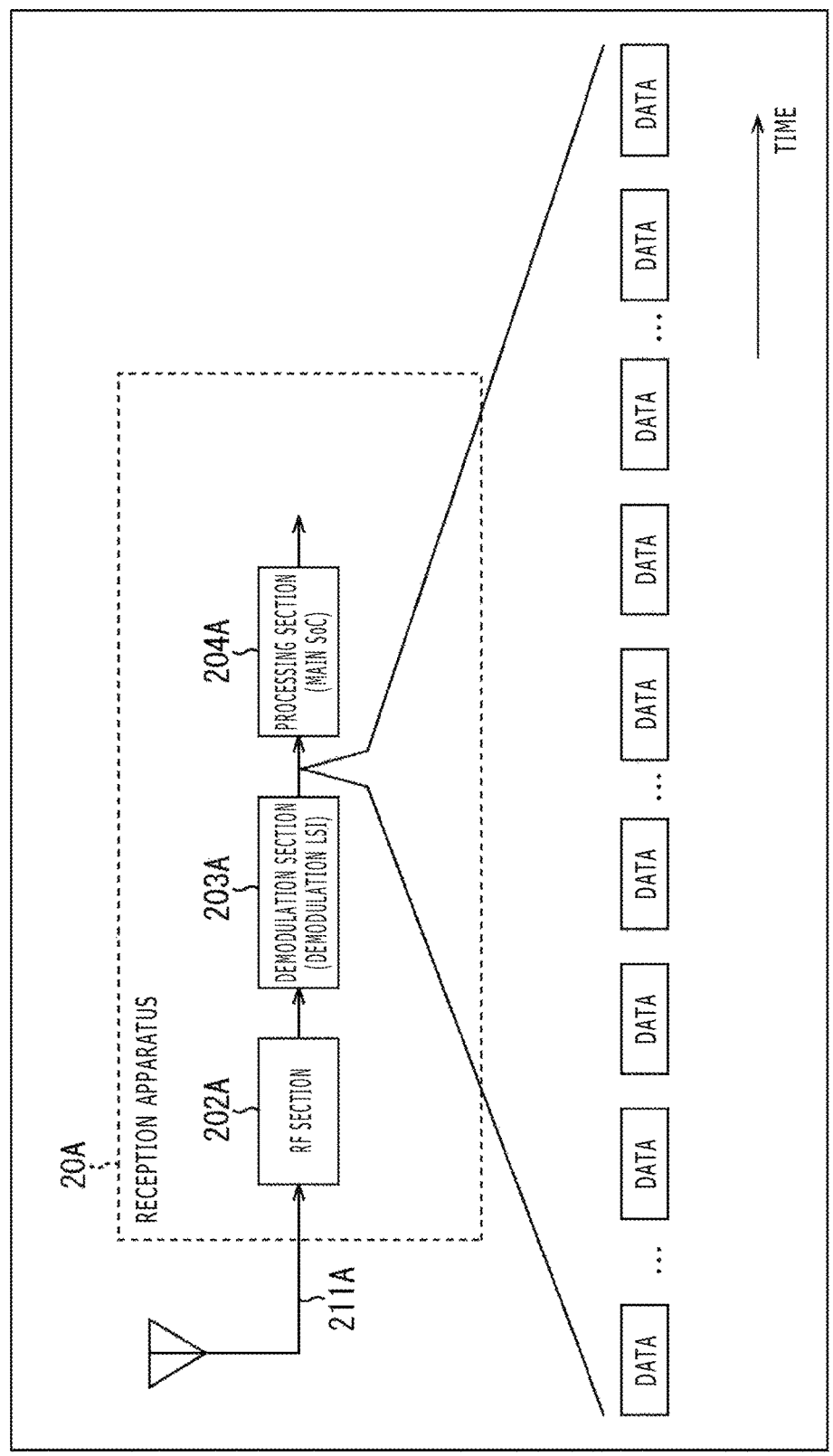
FIG. 19 is a diagram schematically representing data transported between a demodulation LSI and a main SoC when an ordinary reception apparatus is used.

FIG. 19 schematically represents data transported between a demodulation LSI (demodulation section 203A) and a main SoC (processing section 204A) in the ordinary reception apparatus 20A. It should be noted that "Data" in the drawing represents an ALP packet storing video, audio, and other data.

The reception apparatus 20A illustrated in FIG. 19 does not handle the above series of processes. In order to transport time information from the demodulation LSI (demodulation section 203) to the main SoC (processing section 204), therefore, it is necessary to transport time information through a separate signal line (separate pin) or by serial communication or other means. Depending on the circumstances, jitter may be introduced.

Figure 20:
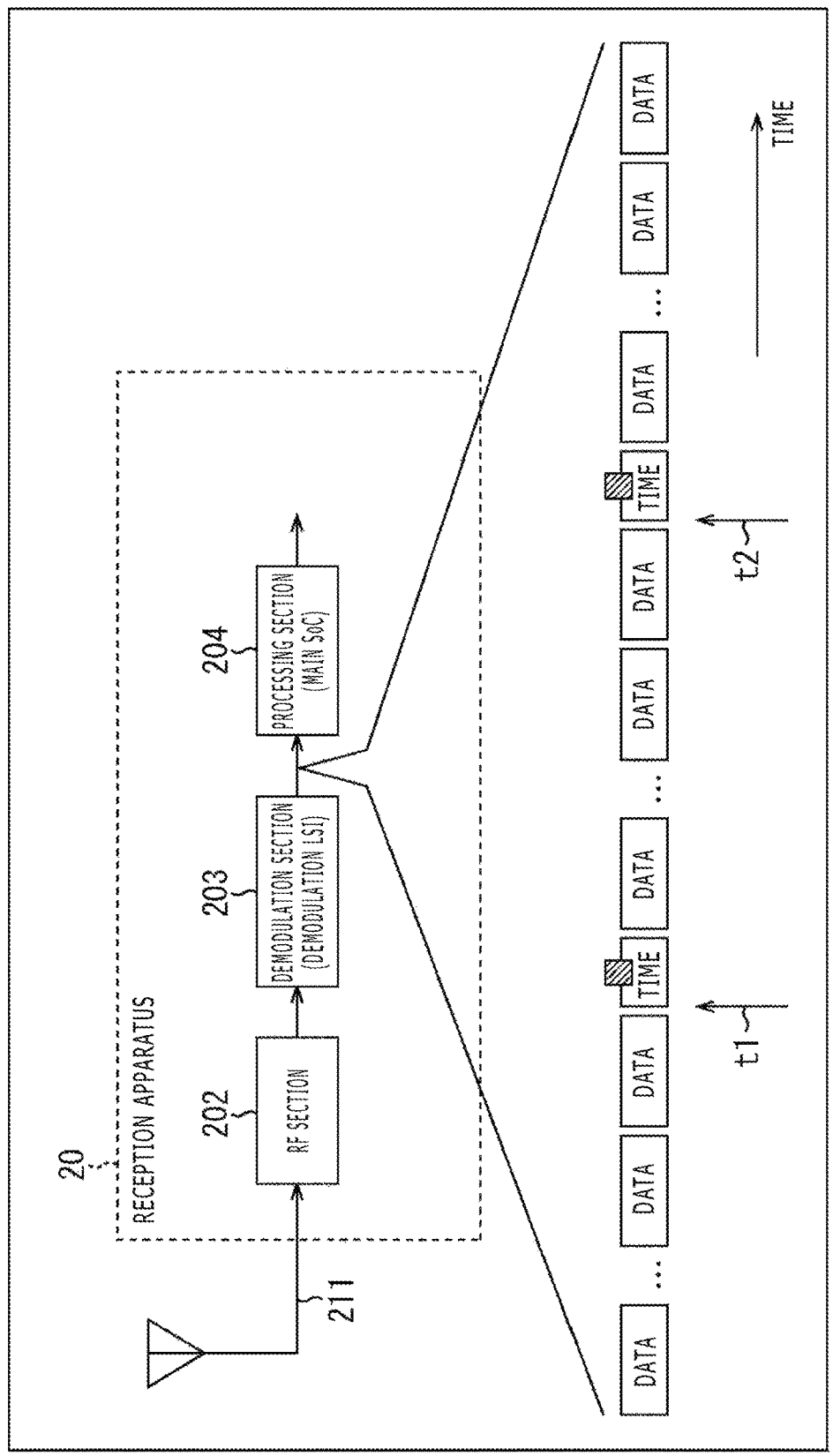
FIG. 20 is a diagram schematically representing data transported between a demodulation LSI and a main SoC when the reception apparatus illustrated in FIG. 2 is used.

On the other hand, FIG. 20 schematically represents data transported between the demodulation LSI (demodulation section 203) and the main SoC (processing section 204) in the reception apparatus 20 illustrated in FIG. 2. It should be noted that "Data" in the drawing represents an ALP packet storing video, audio, and other data, and that "Time" in the drawing represents an ALP packet including time information (PTP).

In this reception apparatus 20, the above series of processes are performed. In the demodulation LSI (demodulation section 203), therefore, time information (PTP) acquired from a physical layer frame is stored in an ALP packet, and that ALP packet including time information (PTP) is output at a constant timing in step with the time reference point P in the physical layer frame.

As a result, the main SoC (processing section 204) successively acquires ALP packets including time information (PTP) at the one frame worth of interval (frame period) from the demodulation LSI (demodulation section 203), allowing for detection of time information (PTP) without being affected by jitter and further allowing, for example, for detection of the start position of a frame without being affected by jitter. It should be noted that, in the example illustrated in FIG. 20, the interval between time t1 to time t2 corresponds to one frame worth of interval (frame period).

It should be noted that although the output timing of an ALP packet including time information (PTP) has been described here, it is possible to similarly eliminate the impact of jitter even if time information is stored in IP/UDP packets by ensuring that the packets are output at a constant timing in step with the time reference point P.

<5. Processing Flow on Receiving Side>
(Time Information Format Conversion and Output Process)

A description will be given next of the flow of the time information format conversion and output process performed by the reception apparatus 20 illustrated in FIG. 2 with reference to the flowchart illustrated in FIG. 21.

In step S21, the RF section 202 receives a digital broadcasting signal based on an IP transport scheme sent from the transmission apparatus 10 via the antenna 211.

In step S22, the time information acquisition section 243 of the demodulation section 203 acquires time information (PTP) and UTC metadata transported by a physical layer frame obtained from the digital broadcasting signal received by the process in step S21.

In step S23, the time information format conversion section 244 of the demodulation section 203 converts the time information (PTP) and the UTC metadata acquired by the process in step S22 into the same data format as data provided in the payload of the physical layer frame. Here, for example, time information (PTP) and UTC metadata are transformed into the same data format as data provided in the payload of the physical layer frame by storing time information (PTP) and UTC metadata in an ALP packet or an IP/UDP packet.

In step S24, the output section 245 of the demodulation section 203 outputs, to the processing section 204, data that has been converted into the same data format as the payload by the process in step S23, i.e., an ALP packet or an IP/UDP packet including time information (PTP) and UTC metadata. Here, the ALP packet or the IP/UDP packet including time information (PTP) and UTC metadata is output from the demodulation LSI (demodulation section 203) to the main SoC (processing section 204) in step with the time reference point P in the physical layer frame.

Figure 21:
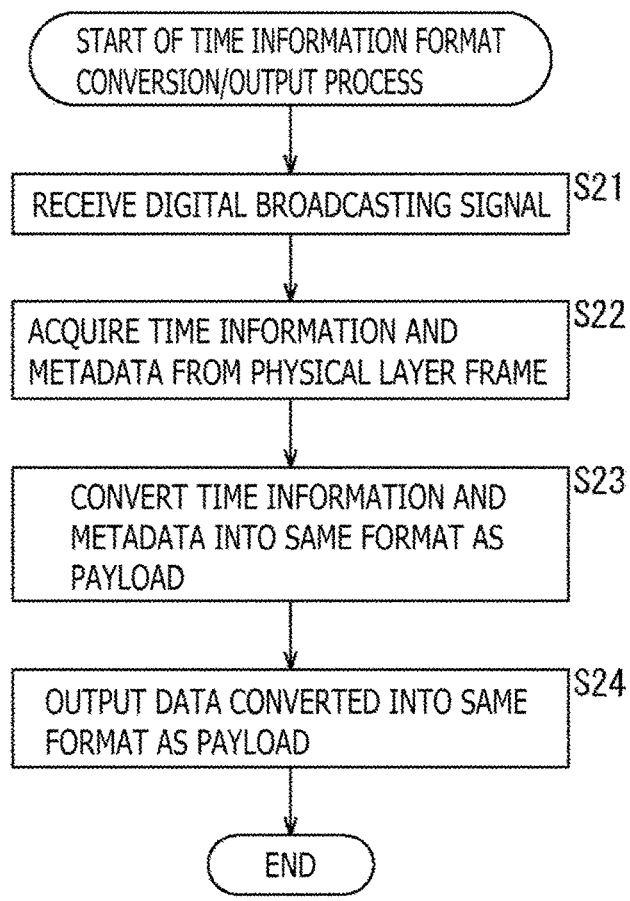
FIG. 21 is a flowchart describing a processing flow for converting and outputting a time information format.

When the process in step S24 ends, the time information format conversion and output process illustrated in FIG. 21 is terminated.

Thus, the flow of the time information format conversion and output process has been described. In this time information format conversion and output process, a digital broadcasting signal for the IP transport scheme is received, time information (PTP) is acquired from a physical layer frame transported in the physical layer of the protocol stack for the IP transport scheme, the time information (PTP) is converted into the same data format as data provided in the payload of the physical layer frame, and data (an ALP packet or an IP/UDP packet including time information (PTP)) converted into the same data format as data provided in the payload is output to the main SoC (processing section 204) in step with the time reference point P in the physical layer frame.

It should be noted that although, in the above description, ATSC (ATSC3.0 in particular), a scheme adopted mainly in US and other countries, has been described as a digital broadcasting standard, the present technology may be applied to ISDB (Integrated Services Digital Broadcasting), a scheme adopted in Japan and other countries, and DVB (Digital Video Broadcasting), a scheme adopted in European and other countries, or other schemes. Also, the present technology may be adopted not only for digital terrestrial broadcasting but also for satellite digital broadcasting, digital wired broadcasting, and so on.

The present technology is also applicable to standards other than digital broadcasting standards. In this case, communication lines such as the Internet and telephone network, for example, can be used as the transport channel 30. Also, the transmission apparatus 10 can be, for example, a server provided on the Internet.

<6. Computer Configuration>

Figure 22:
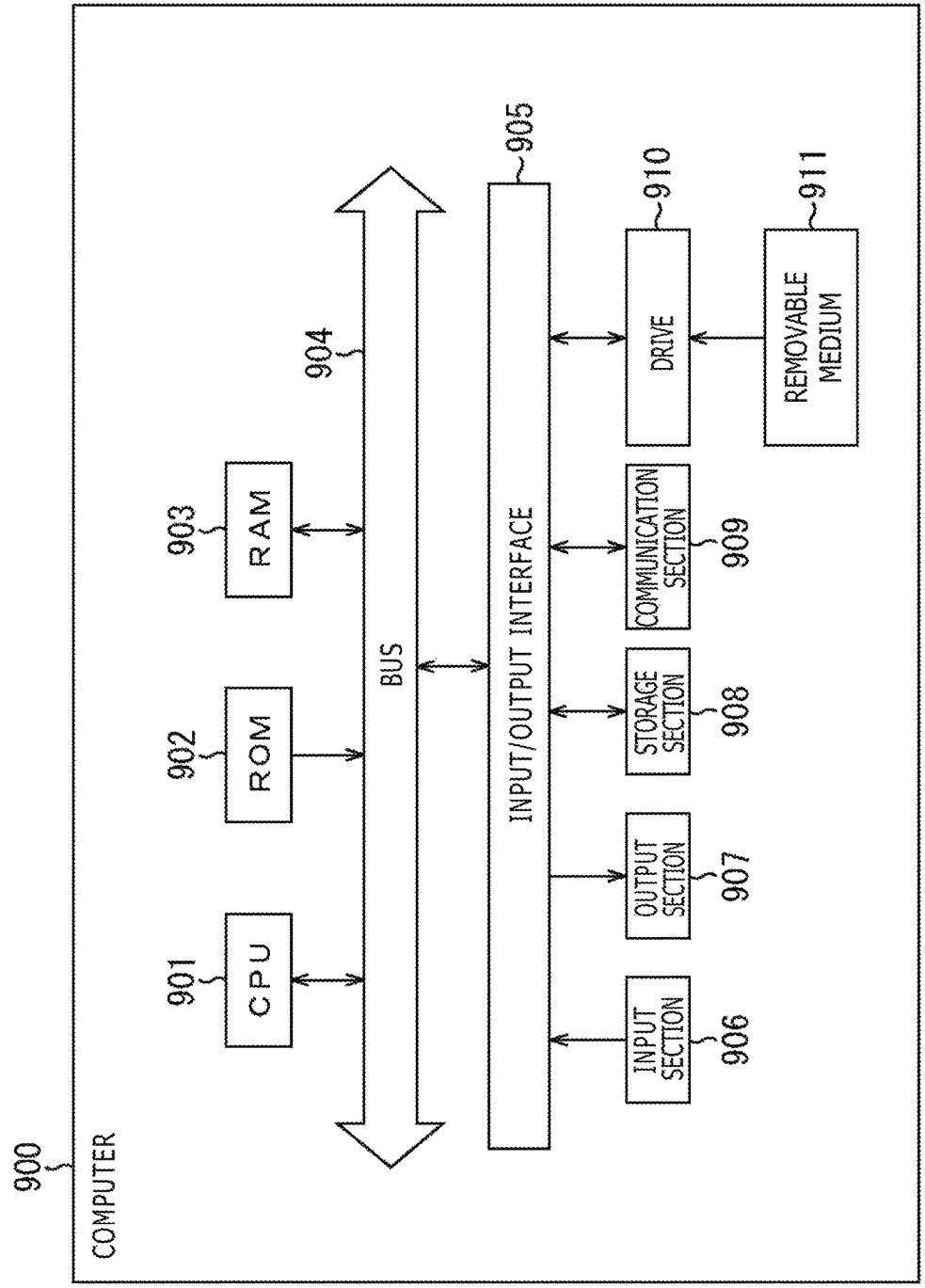
FIG. 22 is a diagram illustrating a configuration example of a computer.

The series of processes described above may be performed by hardware or software. When the series of processes are performed by software, the program making up the series of processes is installed to a computer. FIG. 22 is a diagram illustrating a hardware configuration example of a computer for performing the above series of processes using the program.

In a computer 900, a CPU (Central Processing Unit) 901, a ROM (Read Only Memory) 902, and a RAM (Random Access Memory) 903 are connected to each other by a bus 904. An input/output interface 905 is further connected to the bus 904. An input section 906, an output section 907, a storage section 908, a communication section 909, and a drive 910 are connected to the input/output interface 905.

The input section 906 includes a keyboard, a mouse, a microphone, and so on. The output section 907 includes a display, a speaker, and so on. The storage section 908 includes a hard disk and a non-volatile memory. The communication section 909 includes a network interface and so on. The drive 910 drives a removable medium 911 such as magnetic disk, optical disc, magneto-optical disk, or semi-conductor memory.

In the computer 900 configured as described above, the above series of processes are performed as the CPU 901 loads, for example, the program stored in the ROM 902 or the storage section 908 into the RAM 903 via the input/output interface 905 and the bus 904 for execution.

The program executed by the computer 900 (CPU 901) can be provided in a manner stored, for example, in a removable medium 911 as a packaged medium or the like. Alternatively, the program can be provided via a wired or wireless transport medium such as local area network, the Internet, and digital satellite broadcasting.

In the computer 900, the program can be installed to the storage section 908 via the input/output interface 905 as the removable medium 911 is inserted into the drive 910. Alternatively, the program can be received by the communication section 909 via a wired or wireless transport medium and installed to the storage section 908. In addition to the above, the program can be installed, in advance, to the ROM 902 or the storage section 908.

Here, in the present specification, the processes performed by the computer in accordance with the program need not necessarily be performed chronologically in accordance with the sequence described as a flowchart. That is, the processes performed by the computer in accordance with the program include those that are performed in parallel or individually (e.g., parallel processes or object-based processes). On the other hand, the program may be processed by a single computer (CPU) or by a plurality of computers in a distributed manner.

It should be noted that embodiments of the present technology are not limited to that described above and can be modified in various ways without departing from the gist of the present technology.

The present technology can have the following configurations:

(1) A reception apparatus including:
a reception section adapted to receive a digital broadcasting signal based on an IP (Internet Protocol) transport scheme;
an acquisition section adapted to acquire time information from a physical layer frame transported in a physical layer of a protocol stack for the IP transport scheme;
a conversion section adapted to convert the acquired time information into a same data format as data provided in a payload of the physical layer frame; and
an output section adapted to output the converted time information to a processing section that performs a given process relating to an upper layer that is a layer higher than the physical layer.
(2) The reception apparatus of feature (1), in which
the conversion section stores the time information acquired from the physical layer frame in an IP/UDP packet, an IP packet including a UDP (User Datagram Protocol) packet, or a transport packet for transporting the IP/UDP packet.
(3) The reception apparatus of feature (1) or (2), in which
the output section maintains constant timing when the IP/UDP packet or the transport packet including the time information is output to the processing section.
(4) The reception apparatus of feature (3), in which
the time information is time information indicating a beginning of a preamble, a beginning of a bootstrap, a beginning of a payload, or an insertion location of the time information in the physical layer frame, and
the output section outputs the IP/UDP packet or the transport packet including the time information at a constant interval relative to the beginning of the preamble, the beginning of the bootstrap, the beginning of the payload, or the insertion location of the time information in the physical layer frame.
(5) The reception apparatus of any one of features (1) to (4), in which
the time information is time information defined by PTP (Precision Time Protocol).
(6) The reception apparatus of feature (5), in which
metadata about the time information is transported together with the time information.
(7) The reception apparatus of feature (6), in which
the metadata includes information required for presentation synchronization of transport media.
(8) The reception apparatus of any one of features (5) to (7), in which
the time information is compressed by deleting, of a 48-bit second field and a 32-bit nanosecond field making up time information defined by the PTP, one or more upper bits of the second field and one or more lower bits of the nanosecond field.
(9) The reception apparatus of any one of features (1) to (8), in which
the acquisition section, the conversion section, and the output section are configured as a demodulation LSI,
the processing section is configured as a system-on-chip (SoC), and
the demodulation LSI and the system-on-chip are connected via a given interface.
(10) A data processing method for a reception apparatus, the data processing method including the steps of:
by the reception apparatus,
receiving a digital broadcasting signal based on an IP transport scheme;
acquiring time information from a physical layer frame transported in a physical layer of a protocol stack for the IP transport scheme;
converting the acquired time information into a same data format as data provided in a payload of the physical layer frame; and
outputting the converted time information to a processing section that performs a given process relating to an upper layer that is a layer higher than the physical layer.

REFERENCE SIGNS LIST

1 Transport system
10 Transmission apparatus
20 Reception apparatus
30 Transport channel
201 Control section
202 RF section
203 Demodulation section 204 Processing section
205 Output section
231 FFT trigger estimation section
232 FFT section
233 Channel estimation section
234 Equalization section
235 Frequency de-interleaver
236 L1-Basic extraction section
237 L1-Basic processing section
238 L1-Basic information extraction section
239 L1-Detail extraction section
240 L1-Detail time de-interleaver
241 L1-Detail processing section
242 L1-Detail information extraction section
243 Time information acquisition section
244 Time information format conversion section
245 Output section
900 Computer
901 CPU

The invention claimed is:

1. A reception apparatus comprising:
a reception section adapted to receive a digital broadcasting signal based on an IP (Internet Protocol) transport scheme;
an acquisition section adapted to acquire time information from a physical layer frame transported in a physical layer of a protocol stack for the IP transport scheme;
a conversion section adapted to convert the acquired time information into a same data format as data provided in a payload of the physical layer frame; and
an output section adapted to output the converted time information to a processing section that performs a given process relating to an upper layer that is a layer higher than the physical layer.

2. The reception apparatus of claim 1, wherein
the conversion section stores the time information acquired from the physical layer frame in an IP/UDP packet, an IP packet including a UDP (User Datagram Protocol) packet, or a transport packet for transporting the IP/UDP packet.

3. The reception apparatus of claim 2, wherein
the output section maintains constant timing when the IP/UDP packet or the transport packet including the time information is output to the processing section.

4. The reception apparatus of claim 3, wherein
the time information is time information indicating a beginning of a preamble, a beginning of a bootstrap, a beginning of a payload, or an insertion location of the time information in the physical layer frame, and
the output section outputs the IP/UDP packet or the transport packet including the time information at a constant interval relative to the beginning of the preamble, the beginning of the bootstrap, the beginning of the payload, or the insertion location of the time information in the physical layer frame.

5. The reception apparatus of claim 1, wherein
the time information is time information defined by PTP (Precision Time Protocol).

6. The reception apparatus of claim 5, wherein
metadata about the time information is transported together with the time information.

7. The reception apparatus of claim 6, wherein
the metadata includes information required for presentation synchronization of transport media.

8. The reception apparatus of claim 5, wherein
the time information is compressed by deleting, of a 48-bit second field and a 32-bit nanosecond field making up time information defined by the PTP, one or more upper bits of the second field and one or more lower bits of the nanosecond field.

9. The reception apparatus of claim 1, wherein
the acquisition section, the conversion section, and the output section are configured as a demodulation LSI,
the processing section is configured as a system-on-chip (SoC), and
the demodulation LSI and the system-on-chip are connected via a given interface.

10. A data processing method for a reception apparatus, the data processing method comprising the steps of:
by the reception apparatus,
receiving a digital broadcasting signal based on an IP transport scheme;
acquiring time information from a physical layer frame transported in a physical layer of a protocol stack for the IP transport scheme;
converting the acquired time information into a same data format as data provided in a payload of the physical layer frame; and
outputting the converted time information to a processing section that performs a given process relating to an upper layer that is a layer higher than the physical layer.

* * * * *